(12) United States Patent
Liu

(10) Patent No.: US 12,394,174 B2
(45) Date of Patent: Aug. 19, 2025

(54) IMAGE PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Junyu Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 315 days.

(21) Appl. No.: 17/993,848

(22) Filed: Nov. 23, 2022

(65) Prior Publication Data

US 2023/0091549 A1 Mar. 23, 2023

Related U.S. Application Data

(63) Continuation of application No. PCT/CN2022/080696, filed on Mar. 14, 2022.

(30) Foreign Application Priority Data

Mar. 19, 2021 (CN) .......................... 202110296922.1

(51) Int. Cl.
*G06V 10/46* (2022.01)
*G06T 5/30* (2006.01)
(Continued)

(52) U.S. Cl.
CPC .............. *G06V 10/462* (2022.01); *G06T 5/30* (2013.01); *G06T 7/10* (2017.01); *G06V 40/161* (2022.01);
(Continued)

(58) Field of Classification Search
CPC ...... G06V 10/462; G06V 40/161; G06T 5/30; G06T 7/10; G06T 2207/20132;
(Continued)

(56) References Cited

U.S. PATENT DOCUMENTS 8,363,984 B1 1/2013 Goldman
11,093,734 B2* 8/2021 Kim ..................... G06V 40/176
(Continued)

FOREIGN PATENT DOCUMENTS

CN 110349082 A * 10/2019 ......... G06K 9/00268
CN 111626126 A 9/2020
(Continued)

OTHER PUBLICATIONS

The World Intellectual Property Organization (WIPO) International Search Report for PCT/CN2022/080696 May 5, 2022 6 Pages (including translation).

*Primary Examiner* — Oneal R Mistry
*Assistant Examiner* — Justin Philip Cascais
(74) *Attorney, Agent, or Firm* — ANOVA LAW GROUP PLLC

(57) ABSTRACT

An image processing method includes: performing target object detection on an initial image to obtain an object detection result, and performing image saliency detection on the initial image to obtain a saliency detection result; cropping the initial image based on the object detection result and the saliency detection result to obtain a corresponding cropped image; acquiring an image template for indicating an image style, and acquiring layer information corresponding to the image template; and adding the layer information to the cropped image based on the image template to obtain a target image corresponding to the image style indicated by the image template.

17 Claims, 13 Drawing Sheets

(51) Int. Cl.
*G06T 7/10* (2017.01)
*G06V 40/16* (2022.01)

(52) U.S. Cl.
CPC ............... *G06T 2207/20132* (2013.01); *G06T 2207/20221* (2013.01)

(58) Field of Classification Search
CPC ....... G06T 2207/20221; G06T 2210/22; G06T 11/60; H04N 5/262
See application file for complete search history.

(56) References Cited

U.S. PATENT DOCUMENTS

| | | |
|---|---|---|
| 11,195,046 B2 * | 12/2021 | Rao ........................ G06F 16/538 |
| 11,461,992 B2 * | 10/2022 | Vitek ...................... G06V 10/25 |
| 2022/0189087 A1 * | 6/2022 | Shuvi ...................... G06T 11/60 |
| 2022/0269895 A1 * | 8/2022 | Barkan ............... G06F 18/2113 |

FOREIGN PATENT DOCUMENTS

| | | | |
|---|---|---|---|
| CN | 111768470 A | | 10/2020 |
| CN | 112330532 A | * | 2/2021 |
| CN | 113709386 A | | 11/2021 |

* cited by examiner

IMAGE PROCESSING METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2022/080696, filed on Mar. 14, 2022, which claims priority to Chinese Patent Application No. 202110296922.1, filed on Mar. 19, 2021, the entire contents of both of which are incorporated herein by reference.

FIELD OF THE TECHNOLOGY

The present disclosure relates to an image processing technology, and in particular, to an image processing method and apparatus, a computer device, a computer-readable storage medium, and a computer program product.

BACKGROUND OF THE DISCLOSURE

In some scenarios of image processing, an image needs to be processed, whereby the processed image is used for propaganda and putting.

In the related art, in order to ensure the applicability of an image, it is usual to manually perform targeted post-production on an original image. For example, the original image is cropped to a corresponding size and specification, and relevant propaganda information is added, so as to obtain a propaganda image satisfying the requirements. However, manual production is extremely inefficient and also labor-intensive.

SUMMARY

Embodiments of the present disclosure provide an image processing method and apparatus, a computer-readable storage medium, and a computer program product, which can efficiently generate target images with strong applicability.

The technical solutions in the embodiments of the present disclosure are implemented as follows:

Embodiments of the present disclosure provide an image processing method, including: performing target object detection on an initial image to obtain an object detection result, and performing image saliency detection on the initial image to obtain a saliency detection result; cropping the initial image based on the object detection result and the saliency detection result to obtain a corresponding cropped image; acquiring an image template for indicating an image style, and acquiring layer information corresponding to the image template; and adding the layer information to the cropped image based on the image template to obtain a target image corresponding to the image style indicated by the image template.

Embodiments of the present disclosure provide an image processing apparatus, including: a detection module, configured to perform target object detection on an initial image to obtain an object detection result, and perform image saliency detection on the initial image to obtain a saliency detection result; a cropping module, configured to crop the initial image based on the object detection result and the saliency detection result to obtain a corresponding cropped image; an acquisition module, configured to acquire an image template for indicating an image style, and acquire layer information corresponding to the image template; and a layer addition module, configured to add the layer information to the cropped image based on the image template to obtain a target image corresponding to the image style indicated by the image template.

An embodiment of the present disclosure provides a computer device, including: a memory, configured to store executable instructions; and a processor, configured to perform the image processing method provided in the embodiments of the present disclosure when executing the executable instructions stored in the memory.

An embodiment of the present disclosure provides a non-transitory computer-readable storage medium, storing executable instructions, the executable instructions, when executed by a processor, implementing the image processing method provided in this embodiment of the present disclosure.

An embodiment of the present disclosure provides a computer program product, including a computer program or instruction, the computer program or instruction, when executed by a processor, implementing the image processing method provided in this embodiment of the present disclosure.

This embodiment of the present disclosure has the following beneficial effects:

In the embodiments of the present disclosure, an initial image is cropped based on an object detection result obtained by performing target object detection and a saliency detection result obtained by performing saliency detection on the initial image, so as to retain a face and a saliency feature in the initial image. Then layer information is added to a cropped image based on an image template to obtain a target image corresponding to an image style indicated by the image template, thereby realizing automatic processing of the image and improving the processing efficiency. Moreover, effective information in an original initial image is retained in the obtained target image, and the applicability is strong.

DESCRIPTION OF EMBODIMENTS

Figure 1:
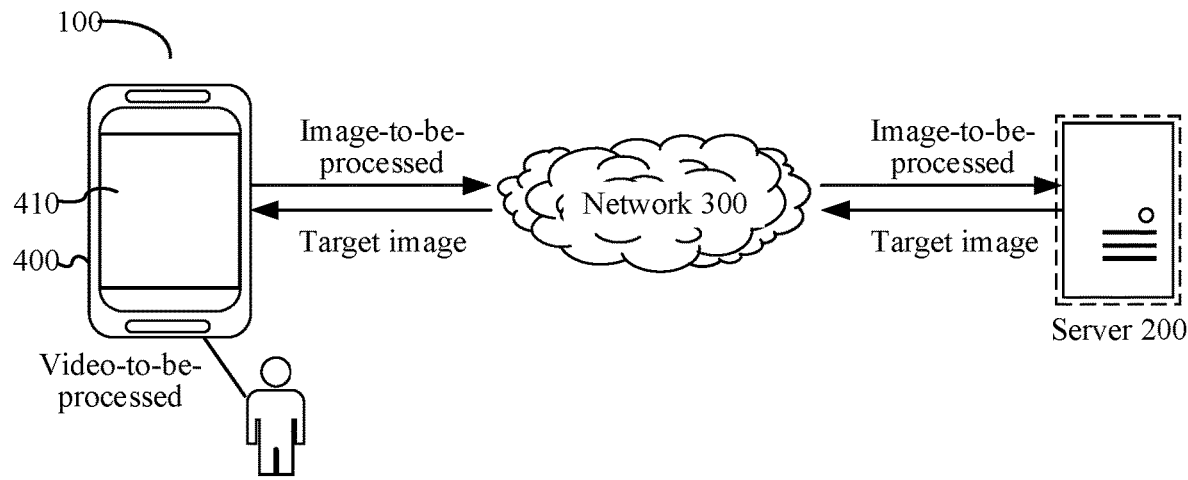
FIG. 1 is a schematic structural diagram of an image processing system architecture according to an embodiment of the present disclosure.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of the present disclosure described herein can be implemented in a sequence in addition to the sequence shown or described herein.

Unless otherwise defined, meanings of all technical and scientific terms used in this specification are the same as those usually understood by a person skilled in the art to which the present disclosure belongs. Terms used in this specification are merely intended to describe objectives of the embodiments of the present disclosure, but are not intended to limit the present disclosure.

Before the embodiments of the present disclosure are further described in detail, a description is made on nouns and terms involved in the embodiments of the present disclosure, and the nouns and terms involved in the embodiments of the present disclosure are applicable to the following explanations.

1) Saliency detection: extraction of salient regions (i.e., regions of human interest) in an image by simulating human visual characteristics through an intelligent algorithm.

2) Face feature map: binary map marked with a face region and a non-face region in an image.

3) Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer sciences, attempts to understand essence of intelligence, and produces a new intelligent machine that can react in a manner similar to human intelligence. The AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology mainly includes fields such as a computer vision (CV) technology, a voice processing technology, a natural language processing technology, and machine learning/deep learning (DL).

Machine learning (ML) is a multi-field interdisciplinary subject involving the probability theory, statistics, the approximation theory, convex analysis, the algorithm complexity theory, and the like. The machine learning specializes in studying how a computer simulates or implements a human learning behavior to obtain new knowledge or skills, and reorganize an existing knowledge structure, so as to keep improving its performance. The machine learning is a core of the AI, is a basic way to make the computer intelligent, and is applied to various fields of the AI. The ML and deep learning generally include technologies such as an artificial neural network, a belief network, reinforcement learning, transfer learning, inductive learning, and learning from demonstrations.

Based on the above explanations of nouns and terms involved in the embodiments of the present disclosure, an image processing system according to an embodiment of the present disclosure is described below. Reference is now made to FIG. 1. FIG. 1 is a schematic architecture diagram of an image processing system 100 according to an embodiment of the present disclosure. A terminal 400 is connected to a server 200 via a network 300. The network 300 may be a wide area network or a local area network, or a combination of the wide area network and the local area network, and realizes data transmission using a radio link.

The terminal 400 (provided with an image processing client) is configured to present a video selection function option in a graphical interface 410 of the image processing client, acquire a selected video-to-be-processed in response to a selection operation for the video selection function option, perform frame extraction processing on the video-to-be-processed to obtain multiple frames of extracted images-to-be-processed, and transmit the multiple frames of images-to-be-processed to the server 200 respectively.

The server 200 is configured to perform target object detection on an initial image to obtain an object detection result, and perform image saliency detection on the initial image to obtain a saliency detection result; crop the initial image based on the object detection result and the saliency detection result to obtain a corresponding cropped image; acquire an image template for indicating an image style, and acquire layer information corresponding to the image template; and add the layer information to the cropped image based on the image template to obtain a target image corresponding to the image style indicated by the image template, and transmit the target image to the terminal 400 so as to receive and display the target image in the terminal 400.

In actual application, the terminal 400 may be, but is not limited to, a notebook computer, a tablet computer, a desktop computer, a smart phone, a dedicated messaging device, a portable game device, a smart speaker box, a smart television, a smart watch, a smart on-board device, etc. The server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The network 300 may be a wide area network or a local area network, or a combination of the wide area network and the local area network. The terminal 400 and the server 200 may be directly or indirectly connected in a wired or wireless communication manner. This is not limited in the embodiments of the present disclosure.

Based on the above description of the image processing system according to the embodiments of the present disclosure, the image processing method according to the embodiments of the present disclosure is described below. In actual implementation, the image processing method according to an embodiment of the present disclosure may be implemented by the terminal 400 or the server 200 shown in FIG. 1 separately, and may also be implemented by the terminal 400 and the server 200 shown in FIG. 1 cooperatively. In the following description, with reference to FIG. 1, the image processing method according to an embodiment of the present disclosure is implemented by, for example, the terminal 400 shown in FIG. 1.

Figure 2:
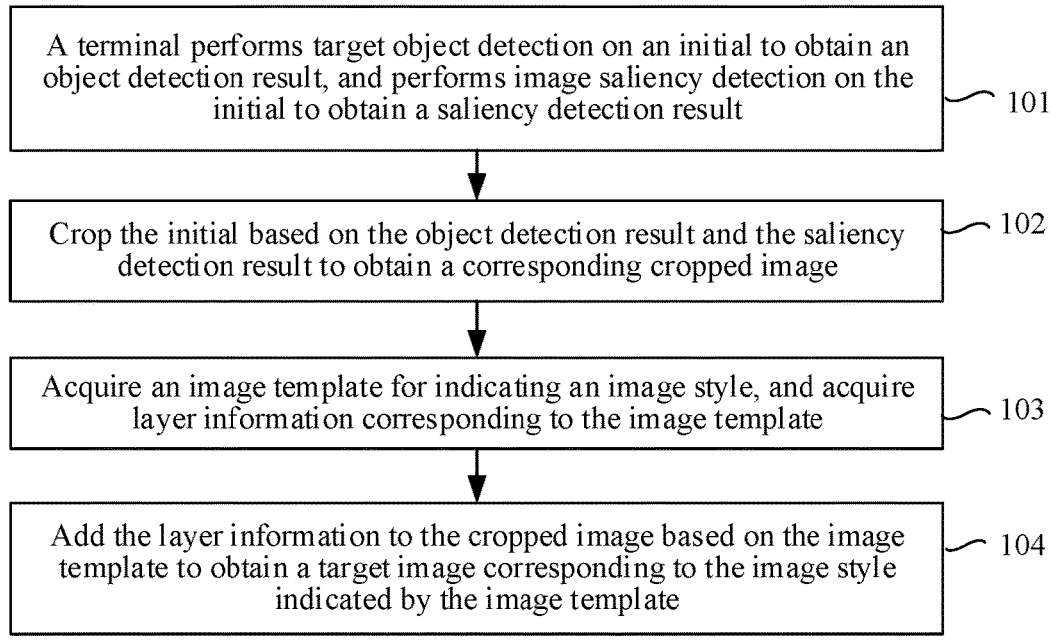
FIG. 2 is a schematic flowchart of an image processing method according to an embodiment of the present disclosure.

Reference is now made to FIG. 2. FIG. 2 is a schematic flowchart of an image processing method according to an embodiment of the present disclosure. The description will be made in conjunction with the steps shown in FIG. 2.

Step 101: A terminal performs target object detection on an initial image to obtain an object detection result, and performs image saliency detection on the initial image to obtain a saliency detection result.

The terminal acquires a video-to-be-processed, performs image frame extraction on the video-to-be-processed, obtains multiple frames of extracted images, and takes the extracted images as images-to-be-processed. The video-to-be-processed may be a video within a video platform having a particular video identifier, and a corresponding initial image may be determined based on the video identifier. In the embodiments of the present disclosure, the terminal performs the image processing method according to the embodiments of the present disclosure respectively for each initial image.

In actual implementation, the terminal performs target object detection on the initial image to obtain a corresponding object detection result. The target object detection is target detection for a target object. The target object may be, for example, a face, a body, a building, a plant, etc. The terminal may select a corresponding target object detection algorithm according to an actual application scenario, and perform target detection of the corresponding target object on the initial image through the selected target object detection algorithm to obtain an object detection result. Exemplarily, when the video-to-be-processed is a film and television video, the target object may be a face or a body, and then a target object detection algorithm for face or body detection may be selected to perform face or body detection on the film and television video, so as to obtain a face or a body in the film and television video. Next, the terminal also performs saliency detection on the initial image to obtain a corresponding saliency detection result.

Figure 3:
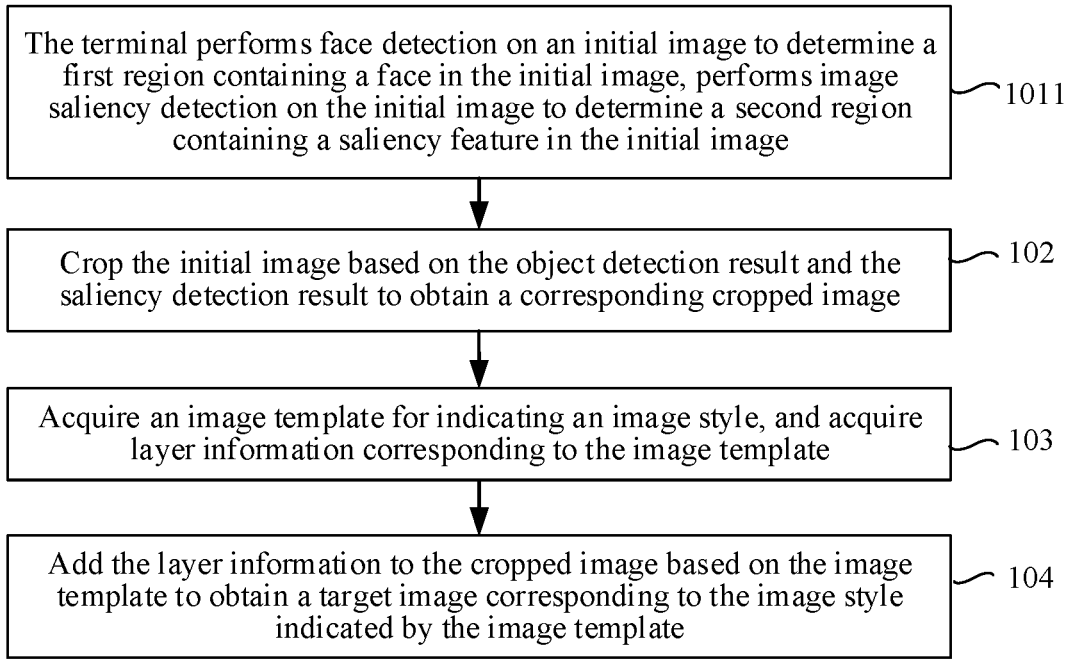
FIG. 3 is a schematic flowchart of an image processing method according to an embodiment of the present disclosure.

In some embodiments, reference is now made to FIG. 3. FIG. 3 is a schematic flowchart of an image processing method according to an embodiment of the present disclosure. Based on FIG. 2, step 101 may also be realized by step 1011 shown in FIG. 3: Step 1011: The terminal performs face detection on an initial image to determine a first region containing a face in the initial image, performs image saliency detection on the initial image to determine a second region containing a saliency feature in the initial image.

In actual implementation, the terminal performs face detection and saliency detection on the initial image respectively to obtain a first region containing a face and a second region containing a saliency feature. The saliency feature may contain a face. That is to say, after performing saliency detection on the initial image, the terminal obtains at least one saliency feature having a saliency reaching a saliency threshold. When the saliency of the face in the initial image reaches the saliency threshold, the saliency feature obtained by the saliency detection contains a face. When the saliency of the face in the initial image does not reach the saliency threshold, the saliency feature obtained by the saliency detection does not contain a face.

Figure 4:
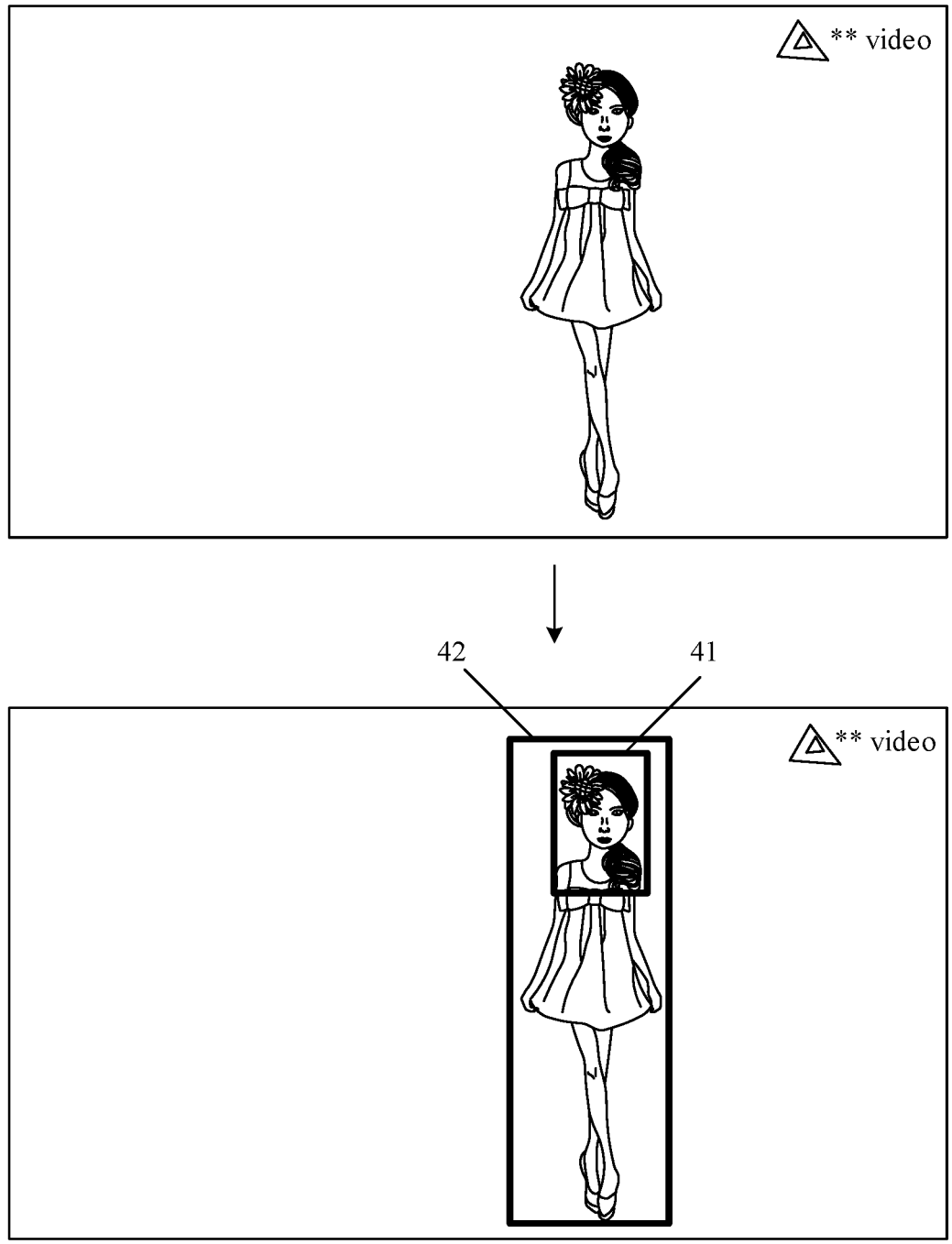
FIG. 4 is a schematic diagram of an initial image according to an embodiment of the present disclosure.

Exemplarily, reference is now made to FIG. 4. FIG. 4 is a schematic diagram of an initial image according to an embodiment of the present disclosure. In actual implementation, the terminal performs face detection on the initial image to obtain a first region 41 containing a face, and performs saliency detection on the initial image to obtain a second region 42 containing a saliency feature. The saliency feature is a body in the initial image.

Step 102: Crop the initial image based on the object detection result and the saliency detection result to obtain a corresponding cropped image.

In actual implementation, after target object detection is performed in the initial image to obtain a target object, an obtained object detection result is used for indicating an object region of the target object in the initial image. The saliency detection result obtained by performing saliency detection on the initial image is used for indicating a saliency feature region of the saliency feature in the initial image. The terminal crops the initial image based on the object region and the saliency feature region. When a target object is detected, the terminal crops the initial image based on the object region corresponding to the target object, and when a target object is not detected, the terminal crops the initial image based on the saliency feature region. In some embodiments, when a target object is detected, the terminal may also crop the initial image based on both the object region and the saliency region.

Specifically, the terminal determines a cropping center point of the initial image based on the object region and the saliency region, and crops the initial image based on the cropping center point to obtain a corresponding cropped image. In actual implementation, the terminal acquires a cropping size specification, and crops the initial image based on the cropping size specification. The cropping size specification may be an aspect ratio w'/h', i.e., the initial image is cropped into a cropped image having this aspect ratio.

In the embodiments of the present disclosure, the initial image has a width w and a height h respectively. When an aspect ratio w/h of the initial image is greater than the aspect ratio w'/h' of the cropping size specification, the terminal takes the cropping center point as a width center of a cropping frame, maintains a height of the cropping frame as h, and crops the initial image to obtain a cropped image having the aspect ratio w'/h'. The cropped image has a height h and a width (w'h)/h'.

Figure 5:
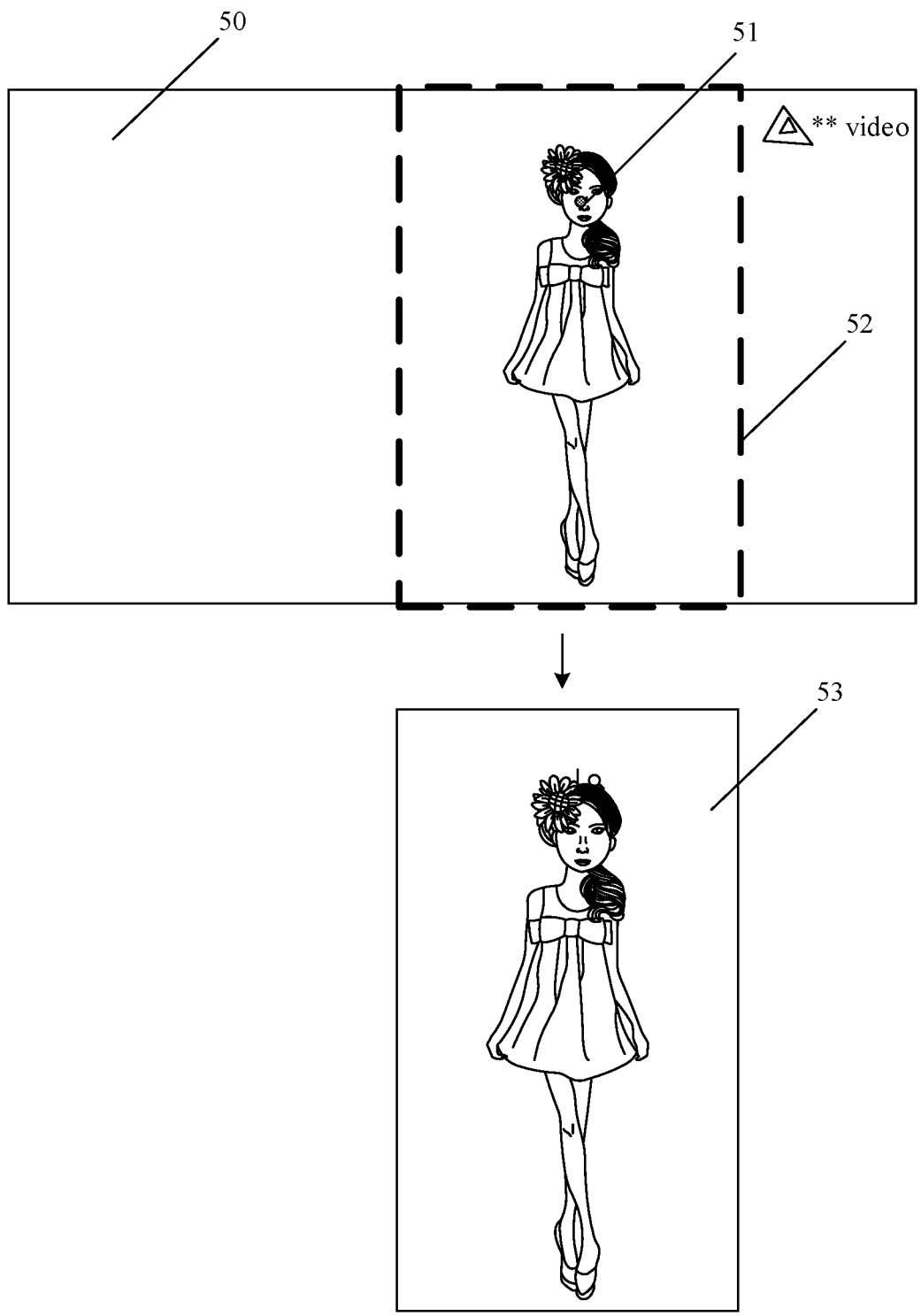
FIG. 5 is a schematic diagram of a process of image cropping according to an embodiment of the present disclosure.

Exemplarily, reference is now made to FIG. 5. FIG. 5 is a schematic diagram of a process of image cropping according to an embodiment of the present disclosure. A cropping center point of an initial image 50 is 51, and the terminal crops the initial image 50 based on the cropping center point 51 and crops the initial image 50 into an image having an aspect ratio w'/h'. Specifically, the terminal takes the cropping center point 51 as a width center of a cropping frame 52, determines a height of the cropping frame 52 as h, and crops the initial image 50 to obtain a cropped image 53 having an aspect ratio w'/h'. The cropped image 53 has a height h and a width (w'h)/h'.

Figure 6:
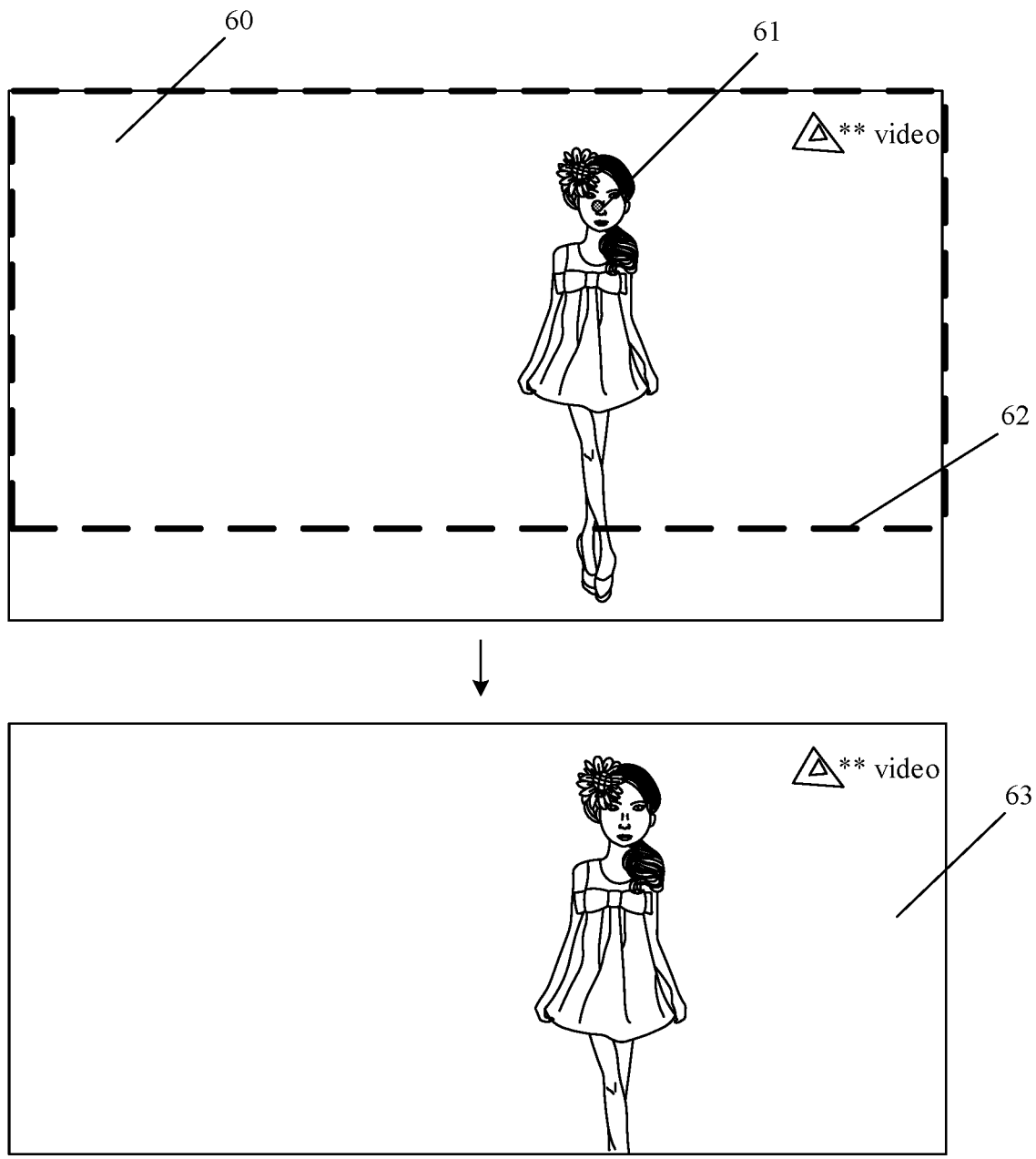
FIG. 6 is a schematic diagram of a process of image cropping according to an embodiment of the present disclosure.

In actual implementation, when an aspect ratio of an initial image is less than an aspect ratio of a cropping size specification, the terminal takes a cropping center point as a height center of a cropping frame, maintains a width of the cropping frame as h, and crops the initial image to obtain a cropped image having an aspect ratio w'/h'. The cropped image has a width w and a height (wh')/w'. Exemplarily, reference is now made to FIG. 6. FIG. 6 is a schematic diagram of a process of image cropping according to an embodiment of the present disclosure. A cropping center point of an initial image 60 is 61, and the terminal crops the initial image 60 based on the cropping center point 61 and crops the initial image 60 into an image having an aspect ratio w'/h'. Specifically, the terminal takes the cropping center point 61 as a height center of a cropping frame 62, determines a width of the cropping frame 62 as w, and crops the initial image 60 to obtain a cropped image 63 having an aspect ratio w'/h'.

In actual implementation, when an aspect ratio of an initial image is equal to an aspect ratio of a cropping size specification, the terminal does not crop the initial image but directly adds layer information to the initial image.

Figure 7:
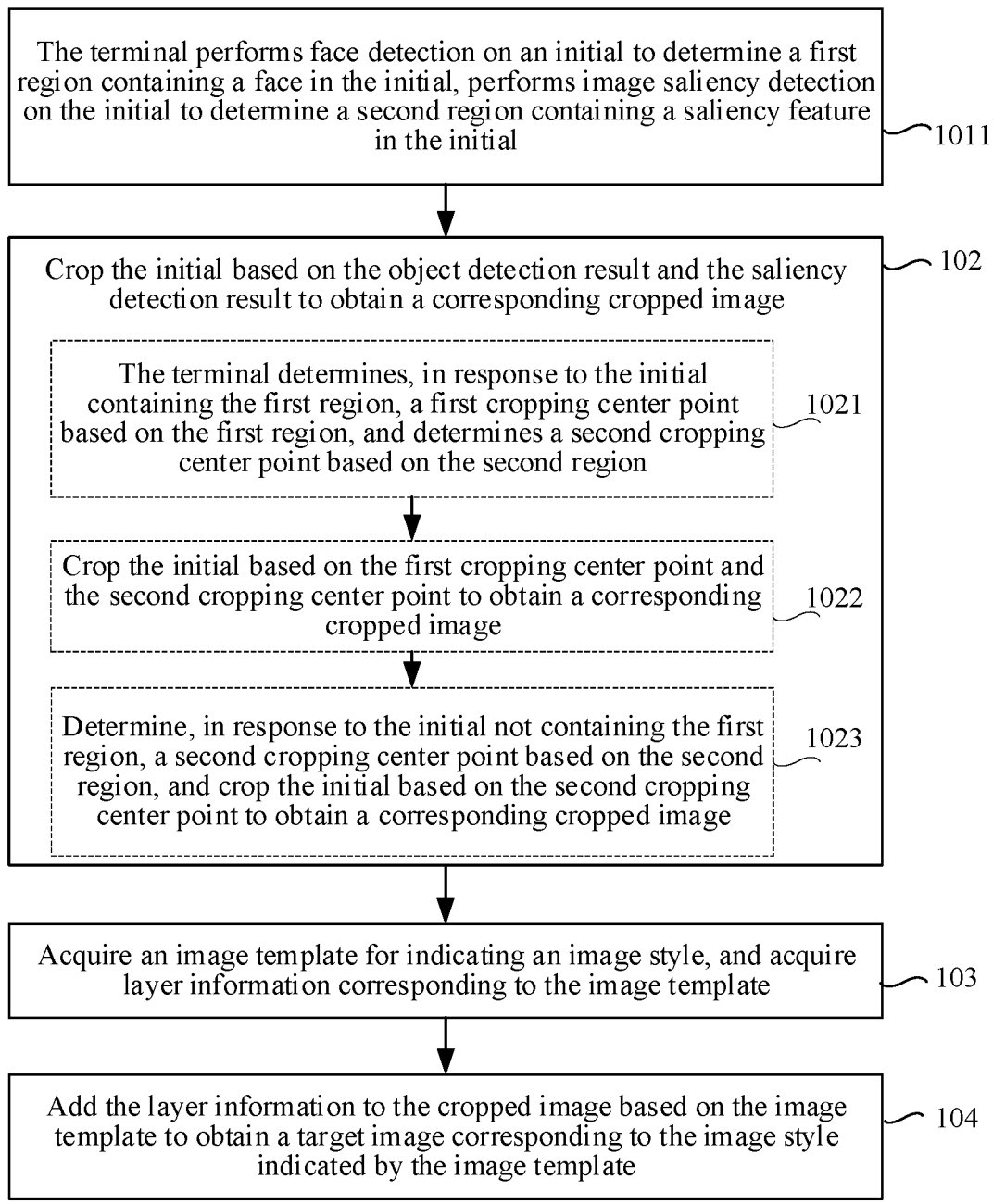
FIG. 7 is a schematic flowchart of an image processing method according to an embodiment of the present disclosure.

In some embodiments, reference is now made to FIG. 7. FIG. 7 is a schematic flowchart of an image processing method according to an embodiment of the present disclosure. Based on FIG. 3, step 102 may also be realized by steps 1021-1023 shown in FIG. 7:

Step 1021: The terminal determines, in response to the initial image containing the first region, a first cropping center point based on the first region, and determines a second cropping center point based on the second region.

In actual implementation, when the initial image contains a first region, i.e. when the terminal performs face detection on the initial image and detects a face in the initial image, a first cropping center point is determined based on the first region containing the face. Specifically, the terminal takes the center of the first region as the first cropping center point. Meanwhile, the terminal determines a second cropping center point based on a second region. The terminal may take the center of the second region as the second cropping center point.

Figure 8:
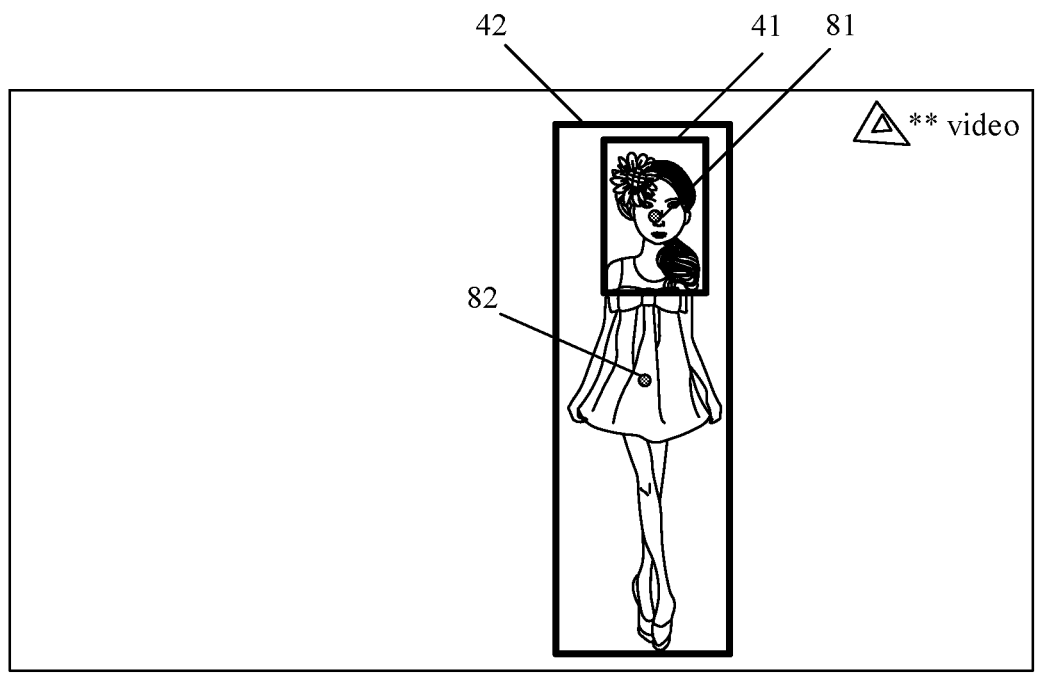
FIG. 8 is a schematic diagram of a cropping center point of an initial image according to an embodiment of the present disclosure.

Exemplarily, reference is now made to FIG. 8. FIG. 8 is a schematic diagram of a cropping center point of an initial image according to an embodiment of the present disclosure. The terminal determines a center point 81 of a first region 41 based on the first region 41, and takes the center point 81 of the first region 41 as a first cropping center point 81. Similarly, the terminal determines a second cropping center point 82 of a second region 42.

Step 1022: Crop the initial image based on the first cropping center point and the second cropping center point to obtain a corresponding cropped image.

In actual implementation, when the first cropping center point does not coincide with the second cropping center point, the terminal crops the initial image by taking the first cropping center point as a cropping center point of the initial image to obtain a corresponding cropped image. The process of cropping the initial image is described with reference to FIG. 5 or FIG. 6 and will not be described in detail herein.

In some embodiments, based on FIG. 7, step 1022 may also be realized by the following manners: cropping, in response to the first cropping center point being located outside the second region, the initial image by the terminal based on the first cropping center point to obtain a corresponding cropped image; determining, in response to the first cropping center point being located inside the second region, a corresponding target cropping center point based on the first cropping center point and the second cropping center point, and cropping the initial image based on the target cropping center point to obtain a corresponding cropped image.

Figure 9:
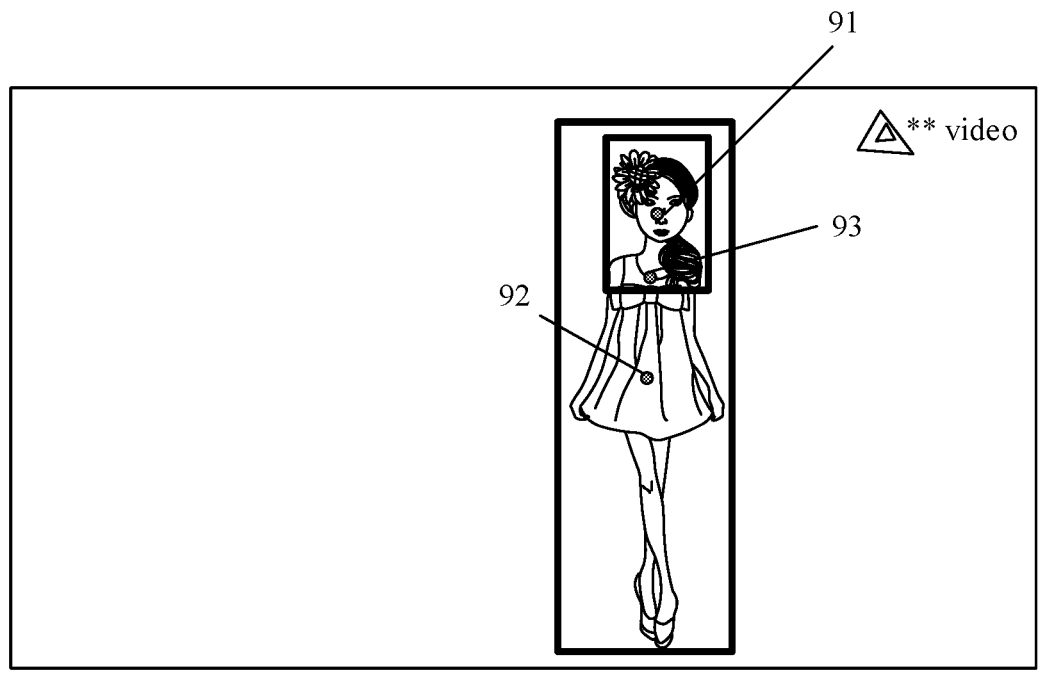
FIG. 9 is a schematic diagram of a cropping center point of an initial image according to an embodiment of the present disclosure.

Exemplarily, reference is now made to FIG. 9. FIG. 9 is a schematic diagram of a cropping center point of an initial image according to an embodiment of the present disclosure. A first cropping center point 91 is located within the second region, and the terminal determines a target cropping center point 93 based on the first cropping center point 91 and a second cropping center point 92. Specifically, the terminal performs weighted summation on coordinates of the first cropping center point 91 and the second cropping center point 92 to obtain corresponding weighted coordinates, and takes a point of a weighted coordinate object as the target cropping center point 93. Next, the terminal crops the initial image by taking the target cropping center point as a cropping center point of the initial image to obtain a corresponding cropped image.

Step 1023: Determine, in response to the initial image not containing the first region, a second cropping center point based on the second region, and crop the initial image based on the second cropping center point to obtain a corresponding cropped image.

In actual implementation, when the initial image does not contain the first region, i.e. when a face is not detected in the initial image, a second detection center point of the second region is obtained based on saliency detection, and the initial image is cropped based on the determined second detection center point.

In some embodiments, based on FIG. 7, the operation of determining a first cropping center point based on the first region in step 1021 may also be realized by the following manners: dilating, when at least two first regions are determined in the initial image, the respective first regions in the initial image respectively by the terminal to obtain corresponding first dilated regions; determining, when the at least two first dilated regions include regions that have a region intersection, first dilated regions having a region intersection, and merging the first dilated regions having the region intersection to obtain a corresponding dilation merged region; and determining the first cropping center point based on the dilation merged region.

In actual implementation, if at least two faces are detected in the initial image, there are at least two first regions correspondingly, and a face feature map is generated based on a face detection result. The face feature map contains a face box for indicating the first region in the initial image, the number of face boxes is the same as the number of faces in the initial image, and the size of the face box is the same as the size of the first region. Next, the terminal dilates the respective face frames based on a dilation coefficient respectively to obtain corresponding dilated face frames. When at least two dilated face frames have a region intersection, i.e., when at least two dilated face frames are communicated, the terminal merges the communicated dilated face frames to obtain a merged face frame. It is to be understood that at least one merged face frame is obtained, and the terminal selects a merged face frame with the largest area from the at least one merged face frame, determines a center point of the merged face frame with the largest area, and crops the initial image based on the center point.

Figure 10:
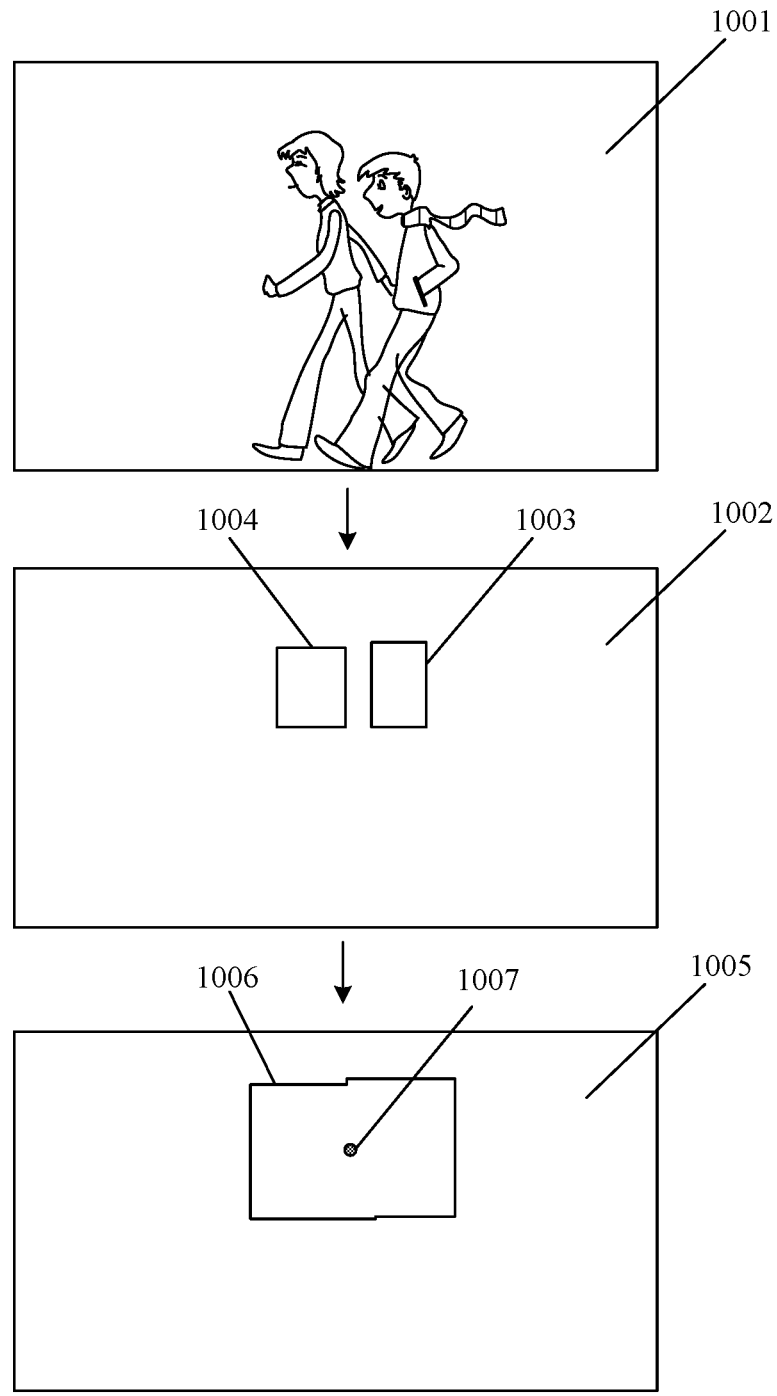
FIG. 10 is a schematic diagram of determining a first cropping center point according to an embodiment of the present disclosure.

Exemplarily, reference is now made to FIG. 10. FIG. 10 is a schematic diagram of determining a first cropping center point according to an embodiment of the present disclosure. After performing face detection on an initial image 1001, the terminal obtains a face feature map 1002. The face feature map 1002 contains face frames 1003 and 1004 for indicating faces in the initial image. Next, the terminal dilates the face frames 1003 and 1004 in the face feature map 1002 respectively to obtain a dilated face feature map 1005 shown in the figure. The two dilated face frames are communicated, and the terminal merges the two dilated face frames as a merged face frame 1006. Then, the terminal determines a center point 1007 of the merged face frame 1006 and crops the initial image based on the center point 1007 of the merged face frame. The cropping process of the initial image is described with reference to the above embodiments, and will not be described in detail herein.

In some embodiments, based on FIG. 2, step 102 may also be realized by the following manners: acquiring, by the terminal, an application scenario type corresponding to the target image; determining an image size corresponding to the cropped image based on the application scenario type; and cropping the initial image based on the object detection result and the saliency detection result to obtain a cropped image corresponding to the image size.

In actual application, image sizes of cropped images required by different application scenario types are different. After acquiring an application scenario type corresponding to a target image, the terminal determines an image size of a cropped image adapted to the application scenario type, and crops the initial image into a cropped image of an image size adapted to the application scenario type in combination with an object detection result and a saliency detection result. Thus, the image sizes of all the obtained cropped images will not be the same, and the applicability and pertinence of the cropped images corresponding to the respective application scenario types can be improved.

Step 103: Acquire an image template for indicating an image style, and acquire layer information corresponding to the image template.

In some embodiments, based on FIG. 2, the operation of acquiring layer information corresponding to the image template in step 103 may also be realized by the following manners: determining, by the terminal, a layer information name in the image style indicated by the image template; and performing layer information identification on the initial image based on the layer information name to obtain layer information corresponding to the layer information name.

The terminal may perform name extraction on the image template to obtain a layer information name in the image style indicated by the image template, then perform layer information identification on the initial image based on the layer information name, semantically analyze, for example, respective regions of the initial image to obtain a region corresponding to semantics matching the layer information name, and extract corresponding region information to obtain layer information corresponding to the layer information name.

Step 104: Add the layer information to the cropped image based on the image template to obtain a target image corresponding to the image style indicated by the image template.

In some embodiments, before step 104, the terminal may also perform the following operations: acquiring, when at least two cropped images are obtained, a resolution corresponding to the target image; and filtering a plurality of cropped images based on the resolution to obtain at least one cropped image having a resolution reaching a resolution threshold. Step 104 may also be realized by the following manners: adding, by the terminal, the layer information to the cropped image having the resolution reaching the resolution threshold based on the image template, so as to obtain a corresponding target image.

In actual implementation, after cropping the initial image to obtain a cropped image, the terminal performs resolution detection on the cropped image so as to filter the cropped image having the resolution not reaching the resolution threshold. The terminal may filter the initial image with a resolution algorithm. When the resolution of the cropped image reaches the resolution threshold, the terminal adds layer information to the cropped image, and generates a corresponding target image and a poster for propaganda and putting.

In some embodiments, based on FIG. 2, step 104 may also be realized by the following manners: determining, in response to the type of the layer information being a non-fixed layer, a first layer placement region in the initial image by the terminal based on the image template; and adding the layer information to the layer placement region to obtain a corresponding target image.

The image template is used for indicating a layer position where layer information is added to the cropped image, the layer information is a layer to be added to the corresponding layer position in the cropped image, and the layer information may be, for example, some layers. The layer information may include a plurality of layers, such as an identification layer, a TV drama name layer, a search box layer, and a search text layer. The identification layer is a layer corresponding to a video identifier of a video platform, and the video platform is configured to play a video-to-be-processed corresponding to the initial image. The video platform may be implemented as a video client, and may also be implemented as a video website, etc. The types of layers include fixed layers and non-fixed layers. For example, in the above exemplary several layers, the identification layer, the search box layer, the search text layer, etc. may be preset fixed layers, while the TV drama name layer may be a preset non-fixed layer.

In actual implementation, when layer information-to-be-added is a fixed layer, the terminal acquires a preset image template, determines a layer position in a corresponding cropped image based on the image template, and adds the fixed layer to the cropped image at the corresponding layer position. It is to be understood that the layer position of the fixed layer is fixed, and the terminal adds the fixed layer to the same layer position when processing any initial image. For example, when the layer information is a fixed layer, the terminal acquires an image template, parses out a corresponding layer position of the fixed layer in the cropped image from the image template, and adds the fixed layer to the corresponding layer position in the cropped image, thereby obtaining a target image added with the layer information. In another example, the terminal acquires a first layer placement region corresponding to the fixed layer based on the image template. It is to be understood that one first layer placement region corresponds to one fixed layer, and size ratios of the first layer placement regions and the fixed layers corresponding thereto are the same. That is, the aspect ratio of regions is the same as the aspect ratio of layers.

In some embodiments, based on FIG. 3, step 104 may also be realized by the following manners: determining, in response to the type of the layer information being a non-fixed layer, a second layer placement region corresponding to the cropped image by the terminal based on the image template; determining a first intersection region between the second layer placement region and the first region, determining a second intersection region between the second layer placement region and the second region, and merging the first intersection region and the second intersection region to obtain a corresponding merged region; acquiring a layer size of the layer information, and selecting a target region corresponding to the layer size, minimally intersecting with the merged region, within the second layer placement region based on the layer size; and adding the layer information to the target region to obtain a target image corresponding to the image style indicated by the image template.

In some embodiments, based on FIG. 3, step 104 may also be realized by the following manners: determining, in response to the type of the layer information being a non-fixed layer, a second layer placement region corresponding to the cropped image by the terminal based on the image template; acquiring a layer size of the layer information and pixel variances of respective regions in the second layer placement region, and selecting a target region corresponding to the layer size, having the smallest pixel variance, in the second layer placement region based on the layer size; and adding the layer information to the target region to obtain a target image corresponding to the image style indicated by the image template.

Figure 11:
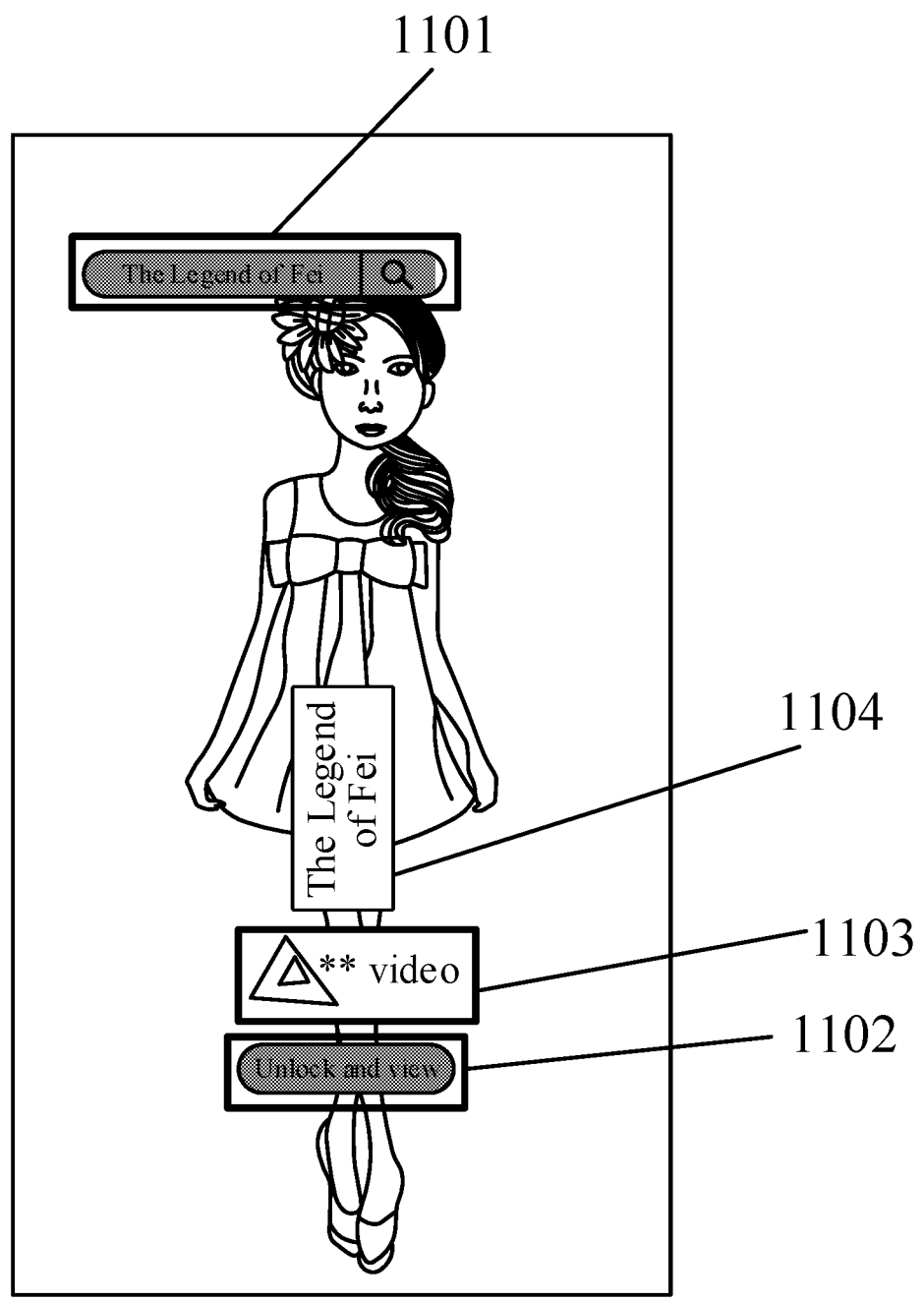
FIG. 11 is a schematic diagram of a target image according to an embodiment of the present disclosure.

In actual implementation, when layer information-to-be-added is a non-fixed layer, the terminal acquires a preset image template, and determines placeable regions in the corresponding cropped image based on the image template. Exemplarily, it is assumed that a layer-to-be-added have sizes of w1 and h1. (Original) The layer regions of the non-fixed layer are non-fixed and are not fixed in size. Exemplarily, reference is now made to FIG. 11. FIG. 11 is a schematic diagram of a target image according to an embodiment of the present disclosure. (Original) The layer information includes a fixed layer and a non-fixed layer. (Original) The fixed layer includes a search function option layer 1101, a click function option layer 1102, an identification layer 1103, etc. (Original) The non-fixed layer includes a TV drama name layer 1104.

In actual implementation, the terminal selects a region minimally intersecting with the face region or saliency region in the initial image as a layer region of the non-fixed layer from the placeable regions, and adds the non-fixed layer to the layer region. In some embodiments, when the intersection of a plurality of regions with the face region or the saliency region is zero, a region with the smallest pixel variation is selected from the placeable regions as a layer region of the non-fixed layer, and the non-fixed layer is added to the layer region to obtain a corresponding target image.

In actual application, after cropping the initial image and adding layer information to obtain a target image, the terminal displays the target image through a target client. Specifically, the terminal also binds the target image with a target link, and it automatically jumps to the target link when a user clicks on the target image. The target link may be a video link corresponding to the initial image.

In some embodiments, based on FIG. 2, when at least two target images are obtained, the terminal performs the following processing on the respective target images: extracting, in response to the target image containing a face, an expression feature of the face to obtain a corresponding face expression feature; scoring the target image based on the face expression feature to obtain a corresponding expression score; and deleting, in response to the expression score not reaching an expression score threshold, the corresponding target image.

In some embodiments, since the initial image is extracted from a video-to-be-processed, there may be a plurality of images-to-be-processed. Therefore, after the terminal performs frame extraction processing on the video-to-be-processed and processes the plurality of images-to-be-processed obtained by frame extraction, a plurality of target images may also be obtained. Therefore, the terminal further screens the plurality of target images so as to obtain a more practical target image. In the embodiments of the present disclosure, when the target image contains a face, the terminal performs expression recognition on the face, extracts corresponding expression features, and performs expression scoring on the target image based on the expression feature to obtain corresponding expression scores. In actual implementation, the terminal may use a trained expression scoring model to extract and score the expression features of the target image. The expression scoring model may be obtained by training based on an image carrying an expression score. Exemplarily, an image showing an undistorted facial expression may be marked with a higher expression score, and an image showing a distorted facial expression may be marked with a lower expression score, etc. A higher expression score represents a more attractive face expression in the image, and the attractive face expression is the undistorted facial expression. If the expression score does not reach an expression score threshold, the target image is deleted, and the target image will not be put to a platform subsequently, etc.

In some embodiments, the terminal may also perform resolution detection on the target images respectively to obtain resolutions of the respective target images, and score the target images based on the resolutions. In some embodiments, the terminal may also perform attractiveness detection on the target images respectively. Specifically, the terminal performs attractiveness detection on the target images based on an attractiveness detection model to obtain the attractiveness of the respective target images, and takes the attractiveness as scores of the target images. The attractiveness detection model is obtained by training based on a large number of images marked with the attractiveness. In some embodiments, the terminal may also score the target images based on the expression of the face in the image. Specifically, the terminal performs expression detection on the target images based on an expression model to obtain corresponding expression scores. The expression model is obtained by training based on a large number of images marked with the expression scores. It is to be understood that an expression score of a person in an image for training is marked according to the normal degree of an expression. For example, a distorted facial feature expression of the person is marked with a lower expression score, and a clear facial feature expression of the person is marked with a higher expression score, etc. In some embodiments, the terminal may also score the target images based on at least one of resolution, attractiveness, and expression scores to obtain scores of the target images. For example, the corresponding resolution, attractiveness and expression score of the target image are weighted and averaged to obtain a final score of the target image. Next, the terminal filters out the target images having scores not reaching a score threshold, and displays the target images having scores reaching the score threshold. In some embodiments, the terminal may also collect user feedback data for a target image in the target client, and score the target image based on the user feedback data. The user feedback data includes a click-through rate of the target image or a retention rate of the target image, etc. Thus, the image is scored in combination with the user feedback data, whereby a finally obtained score is more rationalized, and the accuracy of the score is improved.

In actual implementation, after obtaining scores of a plurality of target images, the terminal screens target images having scores reaching a score threshold from the plurality of target images for putting. In the embodiments of the present disclosure, a target image may be put to a plurality of different target clients, and size requirements of the different target clients on the target image may be different. In actual implementation, the terminal acquires a cropping size specification required by a corresponding platform according to the requirements of the different target clients, and processes an initial image based on the cropping size specification, so as to obtain a target image satisfying the platform.

In some embodiments, the obtained target image may be applied to a scenario in which a video cover image is switched from landscape to portrait. The terminal extracts a landscape image from a landscape video, crops the image into a portrait image satisfying a portrait size, adds corresponding relevant layer information based on the portrait image to obtain a corresponding target image, and uses the target image in a cover of the portrait video for propaganda. In actual application, a video cover or album cover image is usually a landscape style, and with the rise of a portrait video, the cover image also needs to adapt to a portrait style. The embodiments of the present disclosure process a video image according to this need, so as to improve the applicability. However, an image-text thumbnail generally has a fixed size, and an uploaded picture usually has a different proportion to this fixed size. At this moment, the thumbnail can only display a part of the picture. Therefore, it is necessary to select a main body of the picture, so that image-text information may more effectively display the main content of the picture in the thumbnail. In some embodiments, the processed target image may be used for advertising, e.g., intercepting a main body region from an original image, adding layer information of various sizes satisfying the requirements of drawing, and adding the layer information to a corresponding required region to obtain a corresponding target image for propaganda. The target image may also be put to multiple platforms for advertising in a corresponding website, thereby developing new viewers, etc. For example, video frame extraction is performed on a certain drama video in a certain video website, a corresponding target image is automatically manufactured to obtain multiple frames of target images, and the multiple frames of obtained target images are put into different platforms. For example, the target image is bound to a link of the drama video, so as to increase viewers for the drama video and realize effective propaganda.

In the embodiments of the present disclosure, a terminal crops an initial image based on an object detection result obtained by performing target object detection and a saliency detection result obtained by performing saliency detection on the initial image, so as to retain a face and a saliency feature in the initial image. Then layer information is added to a cropped image based on an image template to obtain a target image corresponding to an image style indicated by the image template, thereby realizing automatic processing of the image and improving the processing efficiency. Moreover, effective information in an original initial image is retained in the obtained target image, and the applicability is strong.

Figure 12:
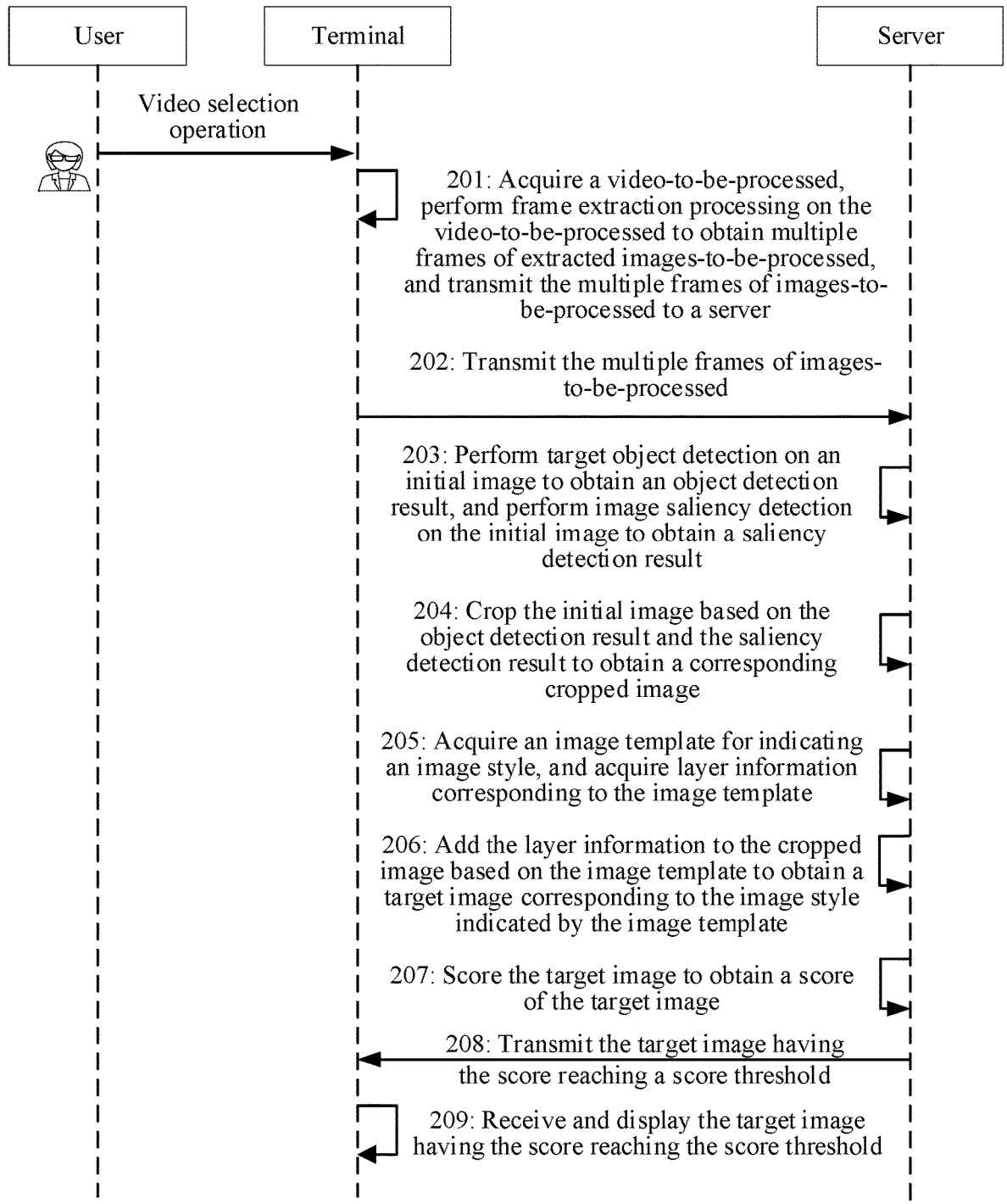
FIG. 12 is a schematic flowchart of an image processing method according to an embodiment of the present disclosure.

Next, the image processing method according to an embodiment of the present invention is continuously introduced. FIG. 12 is a schematic flowchart of an image processing method according to an embodiment of the present invention. Referring to FIG. 12, the image processing method according to an embodiment of the present invention is cooperatively implemented by a terminal and a server.

Step 201: The terminal acquires a video-to-be-processed, and performs frame extraction processing on the video-to-be-processed to obtain multiple frames of extracted images-to-be-processed.

In actual implementation, the terminal presents a video selection function option in a graphical interface of an image processing client. The terminal acquires a selected video-to-be-processed in response to a video selection operation for the video selection function option, and performs video frame extraction on the video-to-be-processed to obtain multiple frames of extracted images-to-be-processed.

Step 202: The terminal transmits the multiple frames of images-to-be-processed to the server.

After acquiring a video-to-be-processed, the terminal performs image frame extraction on the video-to-be-processed, obtains multiple frames of extracted images, takes the extracted images as images-to-be-processed, and transmits the images-to-be-processed to the server.

Step 203: The server performs target object detection on the images-to-be-processed to obtain an object detection result, and performs image saliency detection on the images-to-be-processed to obtain a saliency detection result.

In actual implementation, after acquiring a video-to-be-processed, the server firstly acquires a size specification for image cropping and an image template for indicating an image style, and acquires layer information corresponding to the image template. The image template is used for indicating a layer position where layer information is added to a cropped image, and the layer information is a layer to be added to the corresponding layer position in the cropped image.

Next, the server performs face detection on an initial image to obtain a corresponding face detection result, and when the face detection result characterizes that a face is detected from the initial image, a face region containing a face is determined from the initial image. When one face region is detected, a center point of the face region is determined, and the initial image is cropped based on the center point of the face region. That is, the initial image is cropped into an image having an aspect ratio w'/h'.

Step 204: The server crops the images-to-be-processed based on the object detection result and the saliency detection result to obtain corresponding cropped images.

Step 205: The server acquires an image template for indicating an image style, and acquires layer information corresponding to the image template.

Step 206: The server adds the layer information to the cropped images based on the image template to obtain a target image corresponding to the image style indicated by the image template.

Step 207: The server scores the target image to obtain a score of the target image.

Step 208: The server transmits the target image having the score reaching a score threshold to the terminal.

The server scores the target images respectively to obtain scores of the target images. Next, the terminal filters out the target images having scores not reaching the score threshold, and transmits the target images having scores reaching the score threshold to the terminal for displaying. In actual implementation, the terminal displays a target image through a target client. The target client may be any client capable of displaying an image, such as a news client, a social client, a multimedia client, an e-book client, or a shopping client. The present disclosure does not specifically limit the target client for displaying the target image.

The scoring process of the target image is described with reference to the image processing method embodiments provided by the present disclosure, and will not be described in detail herein. In some embodiments, the server may also collect user feedback data for a target image in the target client, and score the target image based on the user feedback data. The user feedback data includes a click-through rate of the target image or a retention rate of the target image, etc. Thus, the image is scored in combination with the user feedback data, whereby a finally obtained score is more rationalized, and the accuracy of the score is improved. The screening process of the target image is described with reference to the above embodiments of the present disclosure, and will not be described in detail herein.

Step 209: The terminal receives and displays the target image having the score reaching the score threshold.

In actual implementation, after receiving a target image, the terminal binds the target image to a video link corresponding to the target image, and displays the target image bound with the video link in the graphical interface of the target client for a user to browse and read, so as to develop new viewers for a video corresponding to the target image and realize effective propaganda.

In the embodiments of the present disclosure, an initial image is cropped based on an object detection result obtained by performing target object detection and a saliency detection result obtained by performing saliency detection on the initial image, so as to retain a face and a saliency feature in the initial image. Then layer information is added to a cropped image based on an image template to obtain a target image corresponding to an image style indicated by the image template, thereby realizing automatic processing of the image and improving the processing efficiency. Moreover, effective information in an original initial image is retained in the obtained target image, and the applicability is strong.

An exemplary application of the embodiments of the present disclosure in an actual application scenario will be described below.

In actual implementation, the terminal acquires a video-to-be-processed and acquires a size specification for image cropping. Exemplarily, the acquired size specification may be an aspect ratio w'/h'. In some embodiments, the terminal also acquires an image template for indicating an image style, and acquires layer information corresponding to the image template. The image template is used for indicating a layer position where layer information is added to the cropped image, the layer information is a layer to be added to the corresponding layer position in the cropped image, and image information may be, for example, some trademark (e.g., logo) layers.

After acquiring the video-to-be-processed, the size specification for image cropping, the image template for indicating the image style, and the layer information corresponding to the image template, the terminal extracts multiple frames of images from the video-to-be-processed, and processes the respective frames of images respectively. The terminal takes an image extracted from the video-to-be-processed as an initial image. Firstly, the terminal performs face detection on the initial image, for example, by a multi-task cascaded convolutional networks (MTCNN) model to obtain a corresponding face detection result. When the face detection result characterizes that a face is detected from the initial image, a face region containing a face is determined from the initial image. When one face region is detected, a center point of the face region is determined, and the initial image is cropped based on the center point of the face region. That is, the initial image is cropped into an image having an aspect ratio w'/h'.

The initial image has a width w and a height h respectively. When an aspect ratio w/h of the initial image is greater than the aspect ratio w'/h' of the cropping size specification, the terminal takes the center point of the face region as a width center of a cropping frame, maintains a height of the cropping frame as h, and crops the initial image to obtain a cropped image having the aspect ratio w'/h'. The cropped image has a height h and a width (w'h)/h'.

Exemplarily, the terminal firstly performs face detection on an initial image to obtain a face region containing a face in the image. In actual implementation, the face region is labeled by labeling a face frame on the face in the initial image. When the terminal performs face detection to obtain one face region, the terminal directly crops the initial image based on a center point of the face region. When an aspect ratio w/h of the initial image is greater than an aspect ratio w'/h' of a cropping size specification, the terminal obtains a corresponding cropped image by cropping the initial image in the above manner.

In some embodiments, when the aspect ratio of the initial image is less than the aspect ratio of the cropping size specification, the terminal takes the center point of the face region as a height center of a cropping frame, maintains a width of the cropping frame as h, and crops the initial image to obtain a cropped image having an aspect ratio w'/h'. The cropped image has a width w and a height (wh')/w'.

Exemplarily, the aspect ratio w/h of the initial image is less than the aspect ratio w'/h' of a cropping size specification, the terminal obtains a corresponding cropped image by cropping the initial image in the above manner.

In some embodiments, when the aspect ratio of the initial image is equal to the aspect ratio of the cropping size specification, the terminal does not crop the initial image but directly adds layer information to the initial image.

In some embodiments, after performing face detection on the initial image, when no face is detected in the initial image, the terminal performs saliency detection on the initial image to obtain a salient region containing a saliency feature. The saliency detection may adopt a saliency detection algorithm based on a reverse attention mechanism. After detecting the salient region, a center point of the salient region is determined, and the initial image is cropped based on the center point of the salient region to obtain a corresponding cropped image. The cropping process of the initial image is described as above, and will not be described in detail herein.

In some embodiments, after performing face detection on the initial image, if a plurality of faces are detected in the initial image, the terminal obtains a corresponding face feature map. The face feature map contains face frames for indicating faces in the initial image, and the number of face frames is the same as the number of faces in the initial image. Next, the terminal dilates the respective face frames based on a dilation coefficient respectively to obtain corresponding dilated face frames. Next, the terminal merges the communicated dilated face frames to obtain a merged face frame. It is to be understood that at least one merged face frame is obtained, and the terminal selects a merged face frame with the largest area from the at least one merged face frame, determines a center point of the merged face frame with the largest area, and crops the initial image based on the center point to obtain a corresponding cropped image.

Exemplarily, the initial image contains two faces. After performing face detection on the initial image, the terminal obtains a corresponding face feature map. The face feature map contains two face frames for indicating faces in the initial image. Next, the terminal dilates the respective face frames in the face feature map respectively to obtain a dilated face feature map. If the two dilated face frames are communicated, the terminal merges the two dilated face frames as a merged face frame. Then, the terminal determines a center point of the merged face frame and crops the initial image based on the center point of the merged face frame to obtain a corresponding cropped image. The cropping process of the initial image is described with reference to the above embodiments, and will not be described in detail herein.

In actual implementation, after cropping the initial image to obtain a cropped image, the terminal may perform resolution detection on the cropped image and filter the cropped image having the resolution not reaching a resolution threshold. The terminal may use a Laplacian operator of opencv to filter the initial image, and the resolution threshold may be set, for example, 0.8, according to actual requirements. When the resolution of the cropped image reaches the resolution threshold, the terminal adds layer information to the cropped image to generate a corresponding target image for a poster for propaganda and putting. Image information may include a plurality of layers, such as a video APP logo layer, a TV drama name layer, a search box layer, and a search text layer. The types of layers include fixed layers and non-fixed layers. For example, in the above exemplary several layers, the video APP logo layer, the search box layer, the search text layer, etc. may be preset fixed layers, while the TV drama name layer may be a preset non-fixed layer.

When layer information-to-be-added is a fixed layer, a preset image template is acquired, a layer position in a corresponding cropped image is determined based on the image template, and the fixed layer is added to the cropped image at the corresponding layer position. It is to be understood that the layer position of the fixed layer is fixed, and the terminal adds the fixed layer to the same layer position when processing any initial image.

Figure 13:
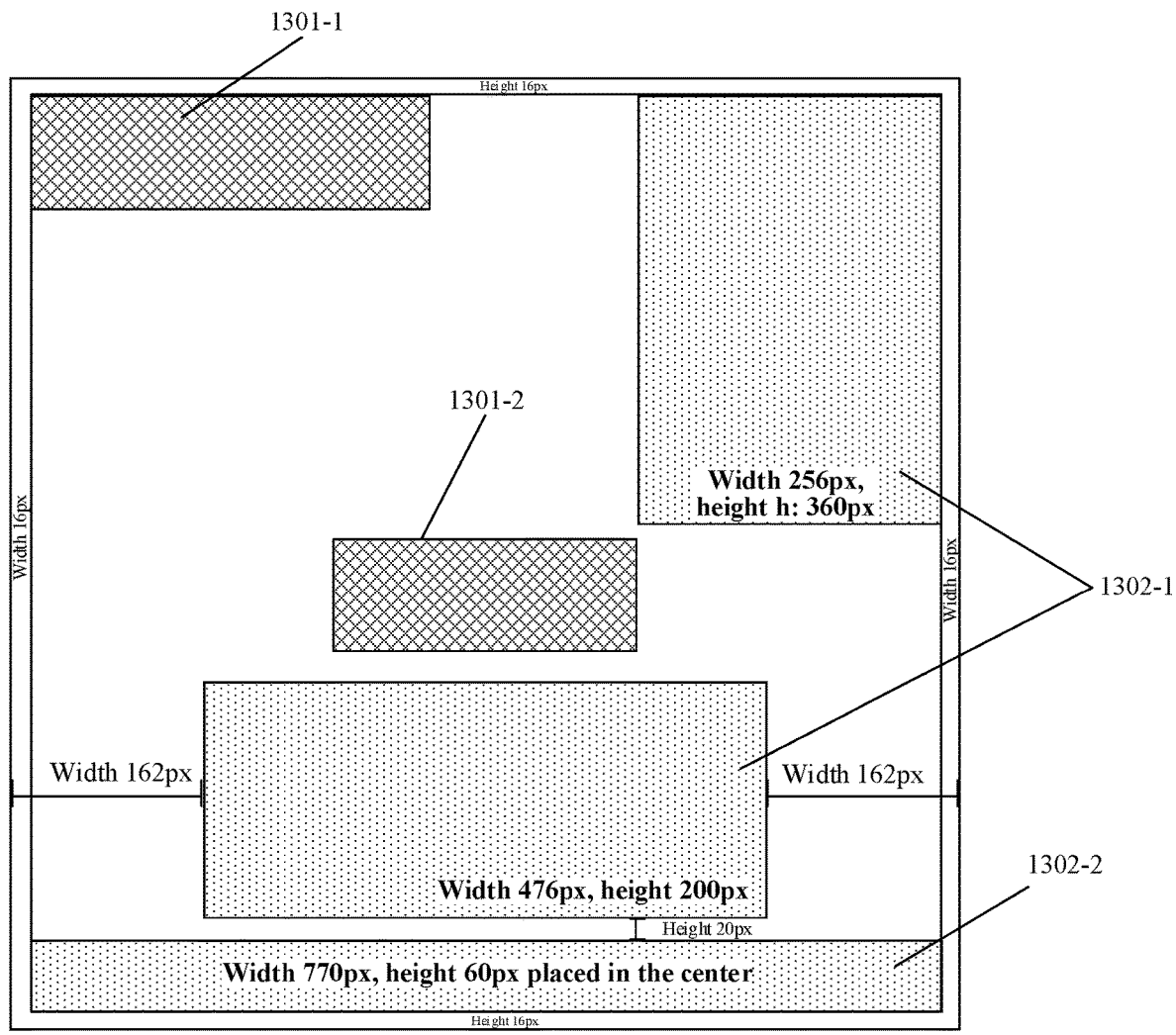
FIG. 13 is a schematic diagram of an image template according to an embodiment of the present disclosure.

When layer information-to-be-added is a non-fixed layer, the terminal acquires a preset image template, and determines placeable regions in the corresponding cropped image based on the image template. Exemplarily, it is assumed that a layer-to-be-added have sizes of w1 and h1. Reference is now made to FIG. 13. FIG. 13 is a schematic diagram of an image template according to an embodiment of the present disclosure. The terminal may add a first fixed layer directly to a first layer placement region 1301-1 and a second fixed layer directly to a first layer placement region 1301-2. The first layer placement region 1301-1 has the same aspect ratio as the first fixed layer, and the first layer placement region 1301-2 has the same aspect ratio as the second fixed layer. The first fixed layer may be, for example, a search function option layer, and the second fixed layer may be, for example, an identification layer. The terminal may select a first target region from the second layer placement region 1302-1, add a first non-fixed layer to the first target region, select a second target region from the second layer placement region 1302-2, and add a second non-fixed layer to the second target region. The selection process of the first target region and the second target region is described with reference to the above embodiments of the present disclosure, and will not be described in detail herein.

In actual implementation, after cropping the initial image and adding layer information to obtain a target image, the terminal transmits the target image to the terminal for displaying. Specifically, the terminal also binds the target image with a target link, and transmits the target image to the terminal for displaying. It automatically jumps to the target link when a user clicks on the target image through a target client in the terminal. The target link may be a video link corresponding to the initial image.

In some scenarios, the obtained target image may also be applied to a scenario in which a video cover image is switched from landscape to portrait. At present, most of video cover images and album cover images are still in a landscape style. However, with the rise of a portrait video, the cover image also needs to adapt to a portrait style. At this moment, one image simultaneously adapts to the requirements of landscape and portrait, and a main body of the picture content needs to be cropped. An image-text thumbnail generally has a fixed size, and a picture uploaded by a user usually has a different proportion to this fixed size. At this moment, the thumbnail can only display a part of the picture. By selecting the main body of the picture, image-text information may more effectively display the main content of the picture in the thumbnail. In some scenarios, the processed image is also used for advertising. A main body region is intercepted from the picture, and other design elements (such as a search box or logo) required for drawing at each size are added to complete the production of a poster, which may be used for advertising, developing new viewers, etc.

In the embodiments of the present disclosure, an initial image is cropped based on an object detection result obtained by performing target object detection and a saliency detection result obtained by performing saliency detection on the initial image, so as to retain a face and a saliency feature in the initial image. Then layer information is added to a cropped image based on an image template to obtain a target image corresponding to an image style indicated by the image template, thereby realizing automatic processing of the image and improving the processing efficiency. Moreover, effective information in an original initial image is retained in the obtained target image, and the applicability is strong.

Figure 14:
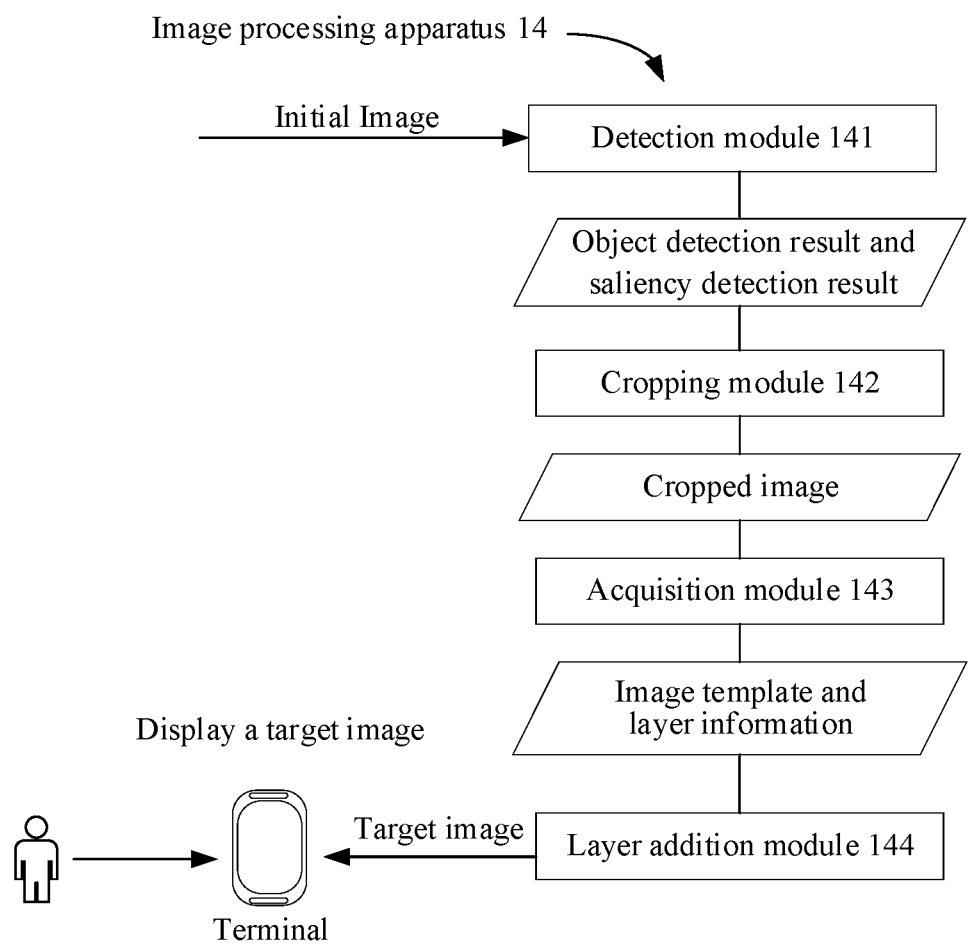
FIG. 14 is a schematic structural diagram of an image processing apparatus according to an embodiment of the present disclosure.

An image processing apparatus 14 according to an embodiment of the present disclosure is continuously described below. Reference is made to FIG. 14. FIG. 14 is a schematic structural diagram of an image processing apparatus 14 according to an embodiment of the present disclosure. The image processing apparatus 14 according to an embodiment of the present disclosure includes:

a detection module 141, configured to perform target object detection on an initial image to obtain an object detection result, and perform image saliency detection on the initial image to obtain a saliency detection result;

a cropping module 142, configured to crop the initial image based on the object detection result and the saliency detection result to obtain a corresponding cropped image;

an acquisition module 143, configured to acquire an image template for indicating an image style, and acquire layer information corresponding to the image template; and a layer addition module 144, configured to add the layer information to the cropped image based on the image template to obtain a target image corresponding to the image style indicated by the image template.

In some embodiments, the detection module is further configured to perform face detection on an initial image, determine a first region containing a face in the initial image, perform image saliency detection on the initial image, and determine a second region containing a saliency feature in the initial image.

In some embodiments, the cropping module is further configured to determine, in response to the initial image containing the first region, a first cropping center point based on the first region, determine a second cropping center point based on the second region, and crop the initial image based on the first cropping center point and the second cropping center point to obtain a corresponding cropped image; and determine, in response to the initial image not containing the first region, a second cropping center point based on the second region, and crop the initial image based on the second cropping center point to obtain a corresponding cropped image.

In some embodiments, the cropping module is further configured to dilate, when at least two first regions are determined, the respective first regions in the initial image respectively to obtain corresponding first dilated regions; determine, when the at least two first dilated regions include regions that have a region intersection, first dilated regions having a region intersection, and merge the first dilated regions having the region intersection to obtain a corresponding dilation merged region; and determine the first cropping center point based on the dilation merged region.

In some embodiments, the cropping module is further configured to crop, in response to the first cropping center point being located outside the second region, the initial image based on the first cropping center point to obtain a corresponding cropped image; and determine, in response to the first cropping center point being located inside the second region, a corresponding target cropping center point based on the first cropping center point and the second cropping center point, and crop the initial image based on the target cropping center point to obtain a corresponding cropped image.

In some embodiments, the cropping module is further configured to acquire an application scenario type corresponding to the target image; determine an image size corresponding to the cropped image based on the application scenario type; and crop the initial image based on the object detection result and the saliency detection result to obtain a cropped image corresponding to the image size.

In some embodiments, the acquisition module is further configured to determine a layer information name in the image style indicated by the image template; and perform layer information identification on the initial image based on the layer information name to obtain layer information corresponding to the layer information name.

In some embodiments, the image processing apparatus further includes: a filter module, configured to acquire, in the presence of a plurality of cropped images, a resolution corresponding to the target image; and filter the plurality of cropped images based on the resolution to obtain at least one cropped image having a resolution reaching a resolution threshold. The layer addition module is further configured to: add the layer information to the cropped image having the resolution reaching the resolution threshold based on the image template.

In some embodiments, the layer addition module is further configured to determine, in response to the type of the layer information being a fixed layer, a first layer placement region in the initial image based on the image template; and add the layer information to the layer placement region; determine, in response to the type of the layer information being a non-fixed layer, a second layer placement region in the initial image based on the image template; determine a target region having the smallest pixel variance in the second layer placement region; and add the layer information to the target region.

In some embodiments, the layer addition module is further configured to determine, in response to the type of the layer information being a non-fixed layer, a second layer placement region corresponding to the cropped image based on the image template; acquire a layer size of the layer information, and select a target region corresponding to the layer size, having the smallest pixel variance, in the second layer placement region based on the layer size; and add the layer information to the target region.

In some embodiments, the layer addition module is further configured to determine, in response to the type of the layer information being a non-fixed layer, a second layer placement region corresponding to the cropped image based on the image template; determine a first intersection region between the second layer placement region and the first region, determine a second intersection region between the second layer placement region and the second region, and merge the first intersection region and the second intersection region to obtain a corresponding merged region; acquire a layer size of the layer information, and select a target region corresponding to the layer size, minimally intersecting with the merged region, within the second layer placement region based on the layer size; and add the layer information to the target region.

In some embodiments, the image processing apparatus further includes: an image screening module, configured to perform, when at least two target images are obtained, the following processing on the respective target images: extracting, in response to the target image containing a face, an expression feature of the face to obtain a corresponding face expression feature; scoring the target image based on the face expression feature to obtain a corresponding expression score; and deleting, in response to the expression score not reaching an expression score threshold, the corresponding target image.

With the embodiments of the present disclosure, an initial image is cropped through an object detection result obtained by performing target object detection and a saliency detection result obtained by performing saliency detection on the initial image, so as to retain a face and a saliency feature in the initial image. Then layer information is added to a cropped image based on an image template to obtain a target image corresponding to an image style indicated by the image template, thereby realizing automatic processing of the image and improving the processing efficiency. Moreover, effective information in an original initial image is retained in the obtained target image, and the applicability is strong.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 15:
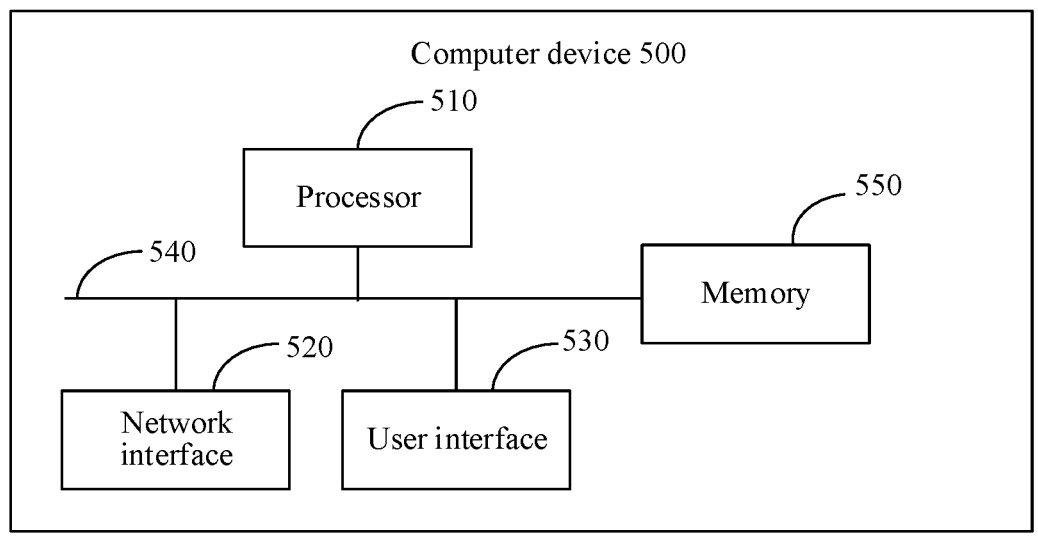
FIG. 15 is a schematic structural diagram of a computer device according to an embodiment of the present disclosure.

Embodiments of the present disclosure also provide a computer device. Reference is now made to FIG. 15. FIG. 15 is a schematic structural diagram of a computer device 500 according to an embodiment of the present disclosure. In actual application, the computer device may be the terminal 400 or the server 200 in FIG. 1. The computer device for implementing the image processing method according to an embodiment of the present disclosure is described with an example where the computer device is the terminal 400 shown in FIG. 1. The computer device includes:

a memory 550, configured to store executable instructions; and a processor 510, configured to perform the image processing method provided in the embodiments of the present disclosure when executing the executable instructions stored in the memory.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 550 may be a removable memory, a non-removable memory, or a combination thereof. Exemplary hardware devices include a solid-state memory, a hard disk drive, an optical disc driver, or the like. The memory 550 may include one or more storage devices physically away from the processor 510.

The memory 550 includes a volatile memory or a non-volatile memory, or may include a volatile memory and a non-volatile memory. The non-volatile memory may be a read-only memory (ROM), and the volatile memory may be a random access memory (RAM). The memory 550 described in the embodiments of the present disclosure is to include any other suitable type of memories.

In some embodiments, at least one network interface 520 and a user interface 530 are further included. Various assemblies in the computer device 500 are coupled together via a bus system 540. It may be understood that the bus system 540 is configured to implement connection and communication between the components. In addition to a data bus, the bus system 540 further includes a power bus, a control bus, and a status signal bus. However, for ease of clear description, all types of buses in FIG. 13 are marked as the bus system 540.

An embodiment of the present disclosure provides a computer program product or a computer program. The computer program product or the computer program includes computer instructions, and the computer instructions are stored in a computer-readable storage medium. a processor of a computer device reads the computer instructions from the computer-readable storage medium, and executes the computer instructions, to cause the computer device to perform the image processing method in the embodiments of the present disclosure.

An embodiment of the present disclosure provides a computer-readable storage medium storing executable instructions, the executable instructions, when executed by a processor, causing the processor to perform the image processing method provided in the embodiments of the present disclosure. For example, the image processing method shown in FIG. 2.

In some embodiments, the computer-readable storage medium may be a memory such as an FRAM, a ROM, a PROM, an EPROM, an EEPROM, a flash memory, a magnetic surface memory, an optical disk, or a CD-ROM, or may be various devices including one or any combination of the foregoing memories.

In some embodiments, the computer-executable instructions can be written in the form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a Hyper Text Markup Language (HTML) file, stored in a file that is specially used for a program in discussion, or stored in a plurality of collaborative files (for example, be stored in files of one or more modules, subprograms, or code parts).

In an example, the executable instructions may be deployed to be executed on a computer device, or deployed to be executed on a plurality of computer devices at the same location, or deployed to be executed on a plurality of computer devices that are distributed in a plurality of locations and interconnected by using a communication network.

In conclusion, the embodiments of the present disclosure can efficiently generate target images with strong applicability.

The foregoing descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

What is claimed is:

1. An image processing method, performed by a computer device, the method comprising:
  performing target object detection on an initial image to obtain an object detection result, the object detection result comprising a first region containing a face in the initial image;
  performing image saliency detection on the initial image to obtain a saliency detection result, the saliency detection result comprising a second region containing a saliency feature in the initial image;
  cropping the initial image based on the object detection result and the saliency detection result to obtain a corresponding cropped image;

acquiring an image template for indicating an image style, and acquiring layer information corresponding to the image template; and adding the layer information to the cropped image based on the image template to obtain a target image corresponding to the image style indicated by the image template, comprising:
- determining, in response to the type of the layer information being a non-fixed layer, a second layer placement region corresponding to the cropped image based on the image template;
- determining a first intersection region between the second layer placement region and the first region, determining a second intersection region between the second layer placement region and the second region, and merging the first intersection region and the second intersection region to obtain a corresponding merged region;
- acquiring a layer size of the layer information, and selecting, among a plurality of candidate target regions corresponding to the layer size within the second layer placement region, a region minimally intersecting with the merged region as the target region; and
- adding the layer information to the target region.

2. The method according to claim 1, wherein the cropping the initial image based on the object detection result and the saliency detection result to obtain a corresponding cropped image comprises:
- determining, in response to the initial image containing the first region, a first cropping center point based on the first region, determining a second cropping center point based on the second region, and cropping the initial image based on the first cropping center point and the second cropping center point to obtain the corresponding cropped image; and
- determining, in response to the initial image not containing the first region, a second cropping center point based on the second region, and cropping the initial image based on the second cropping center point to obtain the corresponding cropped image.

3. The method according to claim 2, wherein the determining a first cropping center point based on the first region comprises:
- dilating, when at least two first regions are determined, the respective first regions in the initial image respectively to obtain corresponding first dilated regions;
- merging, when the at least two first dilated regions include regions that have a region intersection, the first dilated regions having the region intersection to obtain a corresponding dilation merged region; and
- determining the first cropping center point based on the dilation merged region.

4. The method according to claim 2, wherein the cropping the initial image based on the first cropping center point and the second cropping center point to obtain a corresponding cropped image comprises:
- cropping, in response to the first cropping center point being located outside the second region, the initial image based on the first cropping center point to obtain a corresponding cropped image; and
- determining, in response to the first cropping center point being located inside the second region, a corresponding target cropping center point based on the first cropping center point and the second cropping center point, and cropping the initial image based on the target cropping center point to obtain a corresponding cropped image.

5. The method according to claim 1, wherein the cropping the initial image based on the object detection result and the saliency detection result to obtain a corresponding cropped image comprises:
- acquiring an application scenario type corresponding to the target image;
- determining an image size corresponding to the cropped image based on the application scenario type; and
- cropping the initial image based on the object detection result and the saliency detection result to obtain a cropped image corresponding to the image size.

6. The method according to claim 1, wherein the acquiring layer information corresponding to the image template comprises:
- determining a layer information name in the image style indicated by the image template; and
- performing layer information identification on the initial image based on the layer information name to obtain layer information corresponding to the layer information name.

7. The method according to claim 1, further comprising:
- acquiring a resolution corresponding to the target image;
- after at least two cropped images are obtained based on the object detection result and the saliency detection result, filtering the at least two cropped images based on the resolution to obtain at least one cropped image having a resolution reaching a resolution threshold;
- the adding the layer information to the cropped image based on the image template comprises:
- adding the layer information to the cropped image having the resolution reaching the resolution threshold based on the image template.

8. The method according to claim 1, wherein the adding the layer information to the cropped image based on the image template comprises:
- determining, in response to the type of the layer information being a fixed layer, a first layer placement region corresponding to the cropped image based on the image template; and
- adding the layer information to the first layer placement region.

9. The method according to claim 1, wherein the adding the layer information to the cropped image based on the image template comprises:
- determining, in response to the type of the layer information being a non-fixed layer, a second layer placement region corresponding to the cropped image based on the image template;
- acquiring a layer size of the layer information and pixel variances of respective regions in the second layer placement region, and selecting a target region corresponding to the layer size, having the smallest pixel variance, in the second layer placement region based on the layer size; and
- adding the layer information to the target region.

10. The method according to claim 1, further comprising:
- performing, when at least two target images are obtained, the following processing on the respective target images:
- extracting, in response to the target image containing a face, an expression feature of the face to obtain a corresponding face expression feature;
- scoring the target image based on the face expression feature to obtain a corresponding expression score; and
- deleting, in response to the expression score not reaching an expression score threshold, the corresponding target image.

11. The method according to claim 1, wherein selecting the region minimally intersecting with the merged region as the target region comprises:
in response to multiple candidate target regions have no intersection with the merged region, determining pixel variances of the multiple candidate target regions; and
selecting, among the multiple candidate target regions, a region having the minimum pixel variance as the target region.

12. An image processing apparatus, comprising:
a memory, configured to store executable instructions; and
a processor, when executing the executable instructions stored in the memory, configured to perform:
performing target object detection on an initial image to obtain an object detection result, the object detection result comprising a first region containing a face in the initial image;
performing image saliency detection on the initial image to obtain a saliency detection result, the saliency detection result comprising a second region containing a saliency feature in the initial image;
cropping the initial image based on the object detection result and the saliency detection result to obtain a corresponding cropped image;
acquiring an image template for indicating an image style, and acquiring layer information corresponding to the image template; and
adding the layer information to the cropped image based on the image template to obtain a target image corresponding to the image style indicated by the image template, comprising:
determining, in response to the type of the layer information being a non-fixed layer, a second layer placement region corresponding to the cropped image based on the image template;
determining a first intersection region between the second layer placement region and the first region, determining a second intersection region between the second layer placement region and the second region, and merging the first intersection region and the second intersection region to obtain a corresponding merged region;
acquiring a layer size of the layer information, and selecting, among a plurality of candidate target regions corresponding to the layer size within the second layer placement region, a region minimally intersecting with the merged region as the target region; and
adding the layer information to the target region.

13. The apparatus according to claim 12, wherein the cropping the initial image based on the object detection result and the saliency detection result to obtain a corresponding cropped image comprises:
determining, in response to the initial image containing the first region, a first cropping center point based on the first region, determining a second cropping center point based on the second region, and cropping the initial image based on the first cropping center point and the second cropping center point to obtain the corresponding cropped image; and
determining, in response to the initial image not containing the first region, a second cropping center point based on the second region, and cropping the initial image based on the second cropping center point to obtain the corresponding cropped image.

14. The apparatus according to claim 13, wherein the determining a first cropping center point based on the first region comprises:
dilating, when at least two first regions are determined, the respective first regions in the initial image respectively to obtain corresponding first dilated regions;
merging, when the at least two first dilated regions include regions that have a region intersection, the first dilated regions having the region intersection to obtain a corresponding dilation merged region; and
determining the first cropping center point based on the dilation merged region.

15. The apparatus according to claim 13, wherein the cropping the initial image based on the first cropping center point and the second cropping center point to obtain a corresponding cropped image comprises:
cropping, in response to the first cropping center point being located outside the second region, the initial image based on the first cropping center point to obtain a corresponding cropped image; and
determining, in response to the first cropping center point being located inside the second region, a corresponding target cropping center point based on the first cropping center point and the second cropping center point, and cropping the initial image based on the target cropping center point to obtain a corresponding cropped image.

16. The apparatus according to claim 12, wherein the cropping the initial image based on the object detection result and the saliency detection result to obtain a corresponding cropped image comprises:
acquiring an application scenario type corresponding to the target image;
determining an image size corresponding to the cropped image based on the application scenario type; and
cropping the initial image based on the object detection result and the saliency detection result to obtain a cropped image corresponding to the image size.

17. A non-transitory computer-readable storage medium, storing executable instructions, the executable instructions, when executed by a processor, implementing:
performing target object detection on an initial image to obtain an object detection result, the object detection result comprising a first region containing a face in the initial image;
performing image saliency detection on the initial image to obtain a saliency detection result, the saliency detection result comprising a second region containing a saliency feature in the initial image;
cropping the initial image based on the object detection result and the saliency detection result to obtain a corresponding cropped image;
acquiring an image template for indicating an image style, and acquiring layer information corresponding to the image template; and
adding the layer information to the cropped image based on the image template to obtain a target image corresponding to the image style indicated by the image template, comprising:
determining, in response to the type of the layer information being a non-fixed layer, a second layer placement region corresponding to the cropped image based on the image template;
determining a first intersection region between the second layer placement region and the first region, determining a second intersection region between the second layer placement region and the second region, and merging the first intersection region and the second intersection region to obtain a corresponding merged region;

acquiring a layer size of the layer information, and selecting, among a plurality of candidate target regions corresponding to the layer size within the second layer placement region, a region minimally intersecting with the merged region as the target region; and adding the layer information to the target region.

* * * * *